US012655831B2

(12) United States Patent
Nevison et al.

(10) Patent No.: US 12,655,831 B2
(45) Date of Patent: Jun. 16, 2026

(54) SLURRY AND USE THEREOF FOR ENHANCING GEOTHERMAL ENERGY PRODUCTION FROM HEAT RESERVOIR AND METHOD FOR PRODUCING SAME

(71) Applicant: Element Technical Services Inc., Calgary (CA)

(72) Inventors: Grant W. Nevison, Lake Country (CA); Lance William Mack, Calgary (CA); Jingyi Wang, Calgary (CA)

(73) Assignee: Element Technical Services Inc., Calgary (CA)

( * ) Notice: Subject to any disclaimer, the term of this patent is extended or adjusted under 35 U.S.C. 154(b) by 192 days.

(21) Appl. No.: 18/492,560

(22) Filed: Oct. 23, 2023

(65) Prior Publication Data

US 2025/0129772 A1     Apr. 24, 2025

(51) Int. Cl.
| | |
|---|---|
| *E21B 43/26* | (2006.01) |
| *E21B 43/12* | (2006.01) |
| *F03G 4/00* | (2006.01) |
| *F28D 20/00* | (2006.01) |

(52) U.S. Cl.
CPC .............. *F03G 4/029* (2021.08); *E21B 43/13* (2020.05); *E21B 43/26* (2013.01); *F03G 4/069* (2021.08); *F28D 20/0052* (2013.01)

(58) Field of Classification Search
CPC ........... F03G 4/069; E21B 43/26; E21B 43/13
See application file for complete search history.

(56) References Cited

U.S. PATENT DOCUMENTS

| | | | |
|---|---|---|---|
| 11,656,002 B2 | 5/2023 | Nevison et al. | |
| 2010/0076738 A1* | 3/2010 | Dean ...................... | G01V 99/00 |
| | | | 703/7 |
| 2013/0211807 A1* | 8/2013 | Templeton-Barrett ...................... | |
| | | | G06F 30/20 |
| | | | 166/313 |
| 2013/0341010 A1* | 12/2013 | Nevison .............. | E21B 43/2605 |
| | | | 166/250.01 |
| 2017/0115420 A1* | 4/2017 | Cazeneuve .............. | G01V 1/50 |

FOREIGN PATENT DOCUMENTS

| | | |
|---|---|---|
| WO | 2009151649 A2 | 12/2009 |
| WO | 2012079078 A2 | 6/2020 |

OTHER PUBLICATIONS

International Preliminary Report on Patentability from Application No. PCT/CA2017/051527 dated Jun. 25, 2019.

(Continued)

*Primary Examiner* — Silvana C Runyan
(74) *Attorney, Agent, or Firm* — TROUTMAN PEPPER LOCKE LLP; Ryan A. Schneider; Dustin B. Weeks

(57) ABSTRACT

A slurry for enhancing geothermal recovery in a subterranean heat reservoir comprises thermal particles and a carrier fluid. The thermal particles have a selected volume, composition and physical properties sufficient to form a thermal pathway in the reservoir with a particle pack thermal conductivity that meets or exceeds a target thermal conductivity at a thermal pathway stress load of the reservoir. The carrier fluid has a selected fluid volume and viscosity sufficient for the slurry to be injected into openings of the reservoir at an injection pressure higher than the reservoir stress value.

16 Claims, 13 Drawing Sheets

(56)     References Cited

OTHER PUBLICATIONS

Orr, 1954) C., et 29-45 al., "Heat Transfer Properties of Liquid-Solid Suspensions," Chem. Eng. Prog. Symp. Series No. 9, 50 (1954) 29-45.

Templeton, et al., "Abandoned Oil/Gas Wells as Sustainable Sources of Renewable Energy," ENERGY vol. 70, pp. 366-373 2014.

Noorollahi, et al., "Three Dimensional Modeling of Heat Extraction from Abandoned Oil Well for Application in Sugarcane Industry in Ahvaz- Southern Iran," Proceedings World Geothermal Congress, Melbourne Australia, Apr. 19-25, 2015.

Ramey, H.J., "Wellbore Heat Transmission," Society of Petroleum Engineers, pp. 427-435, Apr. 1, 1962.

Ville Roitto, "Slurry Flows in Metallurgical Process Engineering—Developing of Tools and Guidelines," Master's Thesis forthe degree of Master of Science in Technology submitted for inspection, Espoo, Apr. 4, 2014, School of Chemical Technology Degree Programme of Chemical Technology.

* cited by examiner

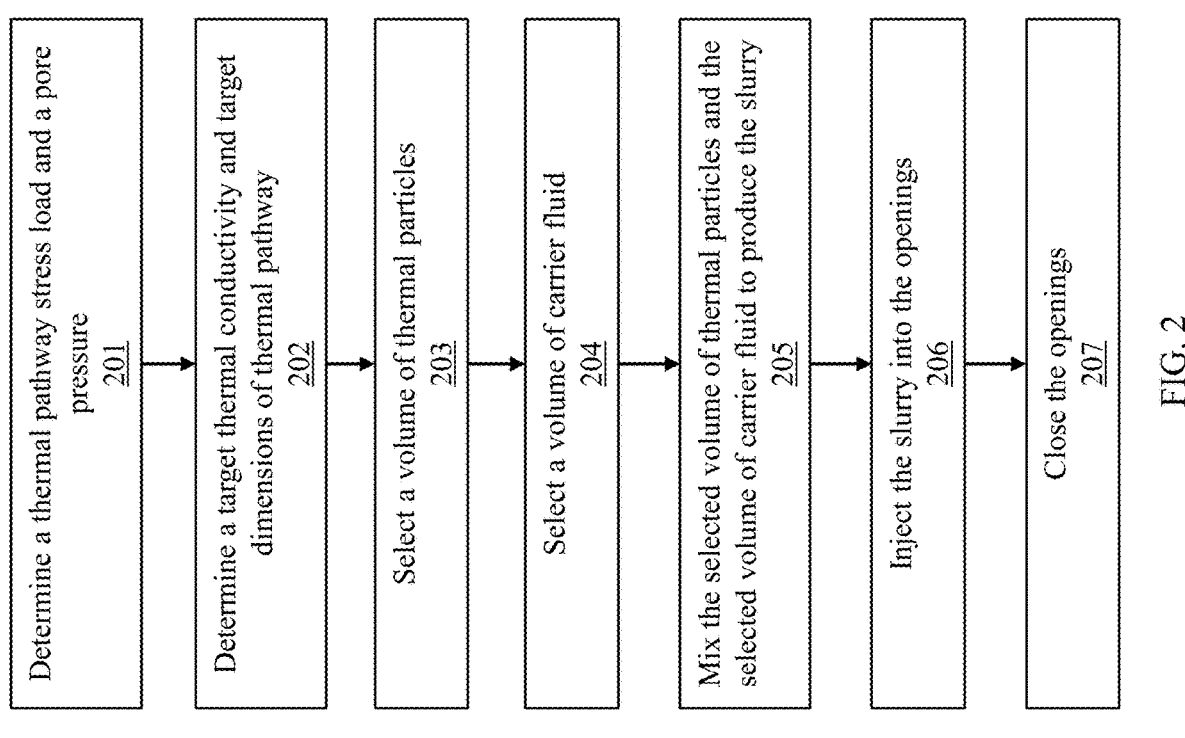

Determine a thermal pathway stress load and a pore pressure
201

Determine a target thermal conductivity and target dimensions of thermal pathway
202

Select a volume of thermal particles
203

Select a volume of carrier fluid
204

Mix the selected volume of thermal particles and the selected volume of carrier fluid to produce the slurry
205

Inject the slurry into the openings
206

Close the openings
207

FIG. 2

SLURRY AND USE THEREOF FOR ENHANCING GEOTHERMAL ENERGY PRODUCTION FROM HEAT RESERVOIR AND METHOD FOR PRODUCING SAME

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Invention

This disclosure relates generally to methods and systems for enhancing geothermal recovery from a thermal pathway in a subterranean heat reservoir and a method for producing a slurry for forming the thermal pathway in the subterranean heat reservoir.

2. Description of Related Art

Geothermal energy is a clean and renewable energy source that emits minimal greenhouse gases and pollutants. It helps to reduce carbon dioxide emissions, mitigate climate change and promote sustainable development. Geothermal power plants have a small land footprint compared to other energy sources, minimizing environmental disturbance. From an economic perspective, geothermal energy is a reliable and cost-effective source of electricity generation, offering long-term price stability and reduced dependence on fossil fuels. In addition, the potential of geothermal energy is vast and largely untapped. With geothermal reservoirs located around the world, there is significant scope for the development and use of this energy source.

In the field of geothermal energy extraction, thermal pathway can be used to enhance the flow of heat from a heat reservoir to a geothermal borehole. It involves the use or creation of natural or induced cracks or fissures, or openings in general, within a subterranean thermal reservoir. These openings are then filled with a specially designed material that has a higher thermal conductivity than the surrounding reservoir rock.

The primary purpose of a thermal pathway is to facilitate the efficient transfer of heat from the adjacent heat reservoir, through the thermal material placed within the flow path, and into the wellbore of a closed system geothermal well. By providing a direct, highly conductive path, the thermal pathway aims to optimize heat transfer and enhance the overall heat flow to the wellbore.

Currently, there is a need to effectively harvest heat energy from heat reservoirs using thermal pathways and to improve the efficiency of geothermal recovery from heat reservoirs.

SUMMARY OF THE INVENTION

According to one aspect of the disclosure, there is provided a method for enhancing geothermal recovery from a thermal pathway in a subterranean heat reservoir. The method comprises:

determining a thermal pathway stress load from an obtained reservoir stress and a pore pressure of the subterranean heat reservoir where the thermal pathway is to be formed;

setting a target thermal conductivity and target dimensions of the thermal pathway;

selecting a volume of thermal particles having a material composition and physical properties that allow the volume of thermal particles to form the thermal pathway and provide a particle pack thermal conductivity under the determined thermal pathway stress load that meets or exceeds the target thermal conductivity;

selecting a volume of carrier fluid having a fluid volume and fluid viscosity that is mixable with the selected volume of thermal particles to produce a slurry that is injectable into openings of the subterranean heat reservoir at an injection pressure higher than the obtained reservoir stress to form the thermal pathway with the target dimensions after closure;

mixing the selected volume of thermal particles and the selected volume of carrier fluid to produce the slurry;

injecting the slurry into the openings in the subterranean heat reservoir at the injection pressure; and closing the openings containing the slurry to form the thermal pathway, comprising ceasing injecting the slurry and allowing at least some of the volume of carrier fluid to leak from the openings into surrounding reservoir or a wellbore until a fluid pressure of the slurry equalizes with the pore pressure of the subterranean heat reservoir.

In some embodiments, the method may further comprise injecting an initial fluid into the subterranean heat reservoir at an initial pressure higher than the obtained reservoir stress to create the openings in the subterranean heat reservoir.

In some embodiments, the slurry may be injected into the openings in the subterranean heat reservoir via the wellbore, and closing the openings containing the slurry may further comprise recovering a portion of the volume of carrier fluid out of the wellbore after the thermal pathway is formed. Additionally or optionally, the method may further comprise hydraulically isolating the thermal pathway from the wellbore after the recovering.

In some embodiments, injecting the slurry into the openings may comprise injecting the slurry into the openings in a plurality of stages with varying ratios of a solid volume of the volume of thermal particles to the fluid volume of the volume of carrier fluid. In some embodiments, the material composition may comprise one or more of the following: lead, gold, silver, tin, zinc, aluminum, copper, brass, hematite, bronze, iron, graphite, aluminum oxide, aluminum nitride, silicon, beryllium oxide or silicon carbide.

In some embodiments, the physical properties of the thermal particles may comprise one or more of the following: a particle size less than ⅓ of a width of the target dimensions of the openings during the injection, a particle shape being one or more of spherical, irregular, plate, or fiber, a particle pack solid volume under the thermal pathway stress load ranged from 50% to 99% of a total volume of the target dimensions of the thermal pathway, a particle thermal conductivity higher than the target thermal conductivity.

In some embodiments, the target dimensions of the thermal pathway may comprise a target width of at least 1 mm and a target length of at least 1 m.

In some embodiments, the target thermal conductivity may be at least 4 W/m·K.

In some embodiments, the target thermal conductivity may be higher than a reservoir thermal conductivity of the subterranean heat reservoir by at least 15%.

According to another aspect of the disclosure, there is provided a method for producing a slurry for forming a thermal pathway in a subterranean heat reservoir. The method comprises:

determining a thermal pathway stress load from an obtained reservoir stress and a pore pressure of the subterranean heat reservoir where the thermal pathway is to be formed;

setting a target thermal conductivity and target dimensions of the thermal pathway;

selecting a volume of thermal particles having a material composition and physical properties that allow the volume of thermal particles to form the thermal pathway and provide a particle pack thermal conductivity under the determined thermal pathway stress load that meets or exceeds the target thermal conductivity;

selecting a volume of carrier fluid having a fluid volume and fluid viscosity that is mixable with the selected volume of thermal particles to produce the slurry that is injectable into openings of the subterranean heat reservoir at an injection pressure higher than the obtained reservoir stress to form the thermal pathway with the target dimensions after closure; and mixing the selected volume of thermal particles and the selected volume of carrier fluid to produce the slurry.

In some embodiments, the material composition may comprise one or more of the following: lead, gold, silver, tin, zinc, aluminum, copper, brass, hematite, bronze, iron, graphite, aluminum oxide, aluminum nitride, silicon, beryllium oxide or silicon carbide.

In some embodiments, the physical properties of the thermal particles may comprise one or more of the following: a particle size less than ⅓ of a width of the openings during an injection of the slurry into the openings, a particle shape being one or more of spherical, irregular, plate, or fiber, a particle pack solid volume under the thermal pathway stress load ranged from 50% to 99% of a total volume of the target dimensions of the thermal pathway, a particle thermal conductivity higher than the target thermal conductivity.

In some embodiments, the target dimensions of the thermal pathway may comprise a target width of at least 1 mm and a target length of at least 1 m.

In some embodiments, the target thermal conductivity may be at least 4 W/m·K.

In some embodiments, the target thermal conductivity is higher than a reservoir thermal conductivity of the subterranean heat reservoir by at least 15%.

According to another aspect of the disclosure, there is provided a method for preparing a volume of thermal particles for enhancing geothermal recovery in a subterranean heat reservoir, the method comprising:

determining a thermal pathway stress load from an obtained reservoir stress and a pore pressure of the subterranean heat reservoir where the thermal pathway is to be formed;

setting a target thermal conductivity and target dimensions of the thermal pathway; and preparing the volume of thermal particles from a type of thermal particle having a material composition and physical properties that allow the volume of thermal particles to form the thermal pathway and provide a particle pack thermal conductivity under the determined thermal pathway stress load that meets or exceeds the target thermal conductivity.

In some embodiments, the material composition may comprise one or more of the following: lead, gold, silver, tin, zinc, aluminum, copper, brass, hematite, bronze, iron, graphite, aluminum oxide, aluminum nitride, silicon, beryllium oxide, or silicon carbide.

In some embodiments, the physical properties of the thermal particles may comprise one or more of the following: a particle size less than ⅓ of a width of the openings during an injection of the slurry into the openings, a particle shape being one or more of spherical, irregular, plate, or fiber, a particle pack solid volume under the thermal pathway stress load ranged from 50% to 99% of a total volume of the target dimensions of the thermal pathway, or a particle thermal conductivity higher than the target thermal conductivity.

In some embodiments, the target thermal conductivity may be higher than a reservoir thermal conductivity of the subterranean heat reservoir by at least 15%.

According to an alternative aspect of the disclosure, there is provided a method for achieving a target width of a thermal pathway formed in a subterranean heat reservoir, the method comprising:

injecting an initial fluid into the subterranean heat reservoir at an initial pressure higher than an obtained reservoir stress to create an opening in the subterranean heat reservoir, the opening having an opening width;

injecting a slurry comprising a volume of thermal particles and a volume of carrier fluid into the created opening to form a particle pack in the opening;

allowing an increase in particle pack volume fraction of the particle pack under a particle pack stress load within the opening as the particle pack is compressed in the opening by ceasing injecting the slurry, wherein the particle pack stress load is determined from an obtained reservoir stress and a fluid pressure of the slurry in the opening; and ensuring that a combined effect of the opening width in response to the particle pack stress load increasing to a full closure stress and the increase in the particle pack volume fraction achieves or exceeds the target width of the thermal pathway, wherein the target width is achieved by determining particle dimensional characteristics and compressive mechanical behaviors of the thermal particles and an initial packing solid volume fraction of the injected thermal particles, thereby ensuring the increase in particle pack volume fraction meets a predetermined condition in response to the particle pack stress load having increased to the full closure stress by which the particle pack becomes the thermal pathway.

In some embodiments, the increase in particle pack volume fraction of the particle pack may be achieved by: allowing at least some of the volume of carrier fluid to leak from the opening into surrounding reservoir or a wellbore until the fluid pressure of the slurry equalizes with a pore pressure of the subterranean heat reservoir.

In some embodiments, the predetermined condition may be an initial closure width multiplied by a ratio of the initial packing solid volume fraction to a full closure solid volume fraction being equal to or greater than the target width.

In some embodiments, the particle dimensional characteristics may fulfill one or more of the following: sizes of the thermal particles are less than ⅓ of a width of the opening at the beginning of the injection of the slurry, or shapes of the thermal particles are one or more of spherical, irregular, plate, or fiber.

In some embodiments, the particle pack stress load may be determined by subtracting the fluid pressure from the obtained reservoir stress as the particle pack is compressed in the opening.

BRIEF DESCRIPTION OF THE DRAWINGS

FIG. 2 is a flowchart of a process for enhancing geothermal recovery in a subterranean heat reservoir according to an embodiment of the present disclosure.

6 for a lower strength, malleable particle pack according to an embodiment of the present disclosure.

Figures 13A, 13B:
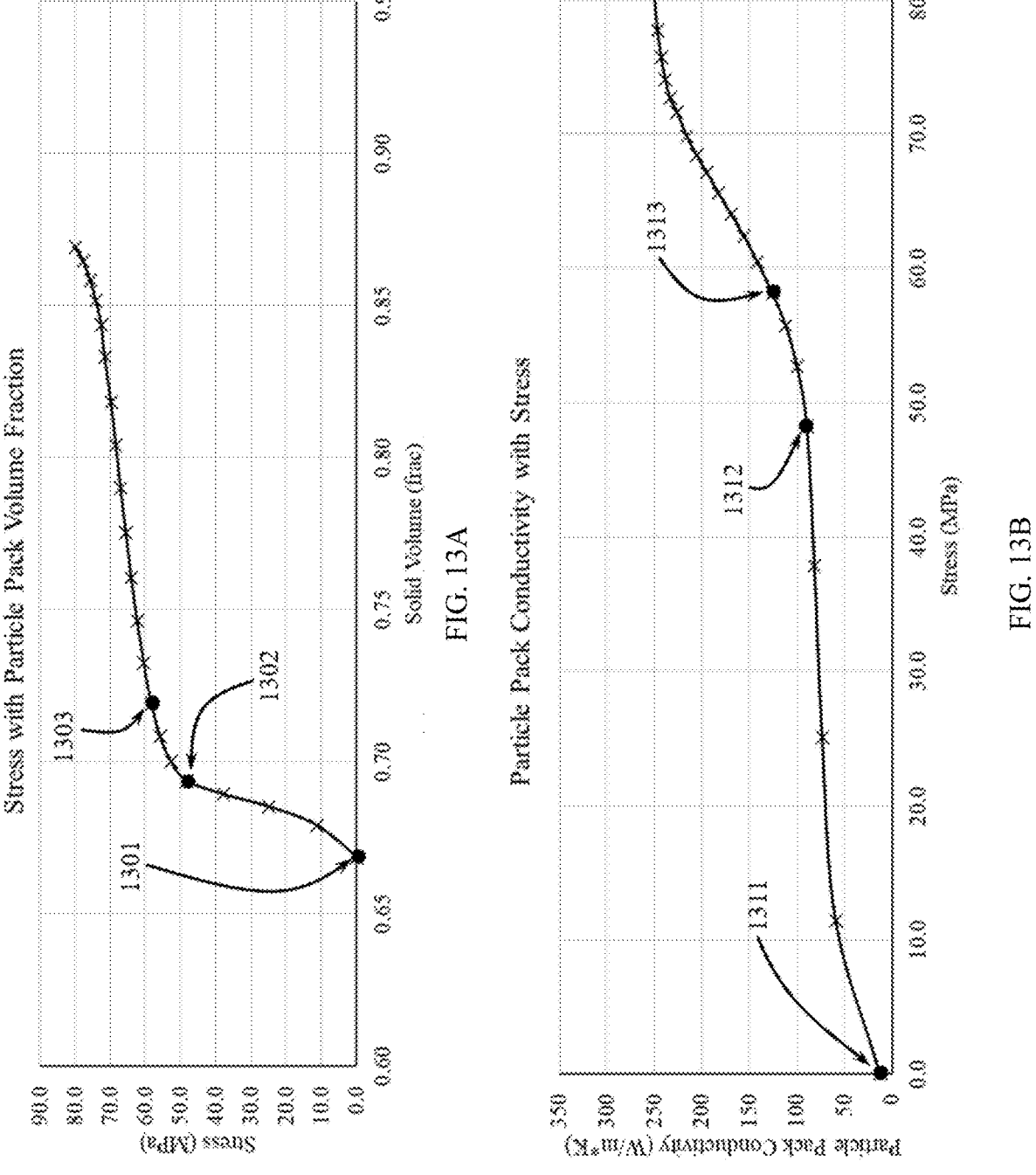

FIGS. 13A and 13B are exemplary plots of particle pack volume fraction and pack conductivity at various load stress for a high-strength, stiff particle pack according to an embodiment of the present disclosure.

DETAIL DESCRIPTION OF THE INVENTION

Definitions

As used in this disclosure, "well" includes a wellbore, a borehole, surrounding rock, a casing and other tubing conduits within the wellbore, cement or other material placed in the borehole during construction, and the formation intervals utilized for geothermal heat.

As used in this disclosure, "thermal pathway" refers to a naturally occurring or artificially created discontinuity, such as a crack, fissure, or opening within a subterranean heat reservoir that has been opened and packed with a thermal material exhibiting thermal conductivity at least 15% greater than the adjacent rock formation. The thermal material is strategically placed within the created discontinuity to form a high thermally conductive pathway to facilitate heat transfer from the adjacent heat reservoir, through the material along the flow path, and ultimately to the wellbore of a sealed geothermal well, to optimize heat transfer and flow to the wellbore.

As used in this disclosure, "thermal materials" are thermal materials in solid particle form, and are selected based at least on their thermal conductivity, particle size and transport related properties. The thermal material transported into the fissure or opening by a slurry are particulate in nature. The form of the particles is at least one of grains, powders, pellets, flakes, fragments or scraps. The shape of the particles may range from spherical, through irregular, to plates and fibers. The composition of the granular thermal material may be any single material or mixture of materials exhibiting a thermal conductivity that is at least 15% greater than that of the surrounding heat source rock. The physical behavior of the granular thermal material under compression may range from soft, plastic, malleable or deformable to brittle, hard, breakable, fragile or stiff, or may be a composite of materials with a range of behaviors. Additionally, the surface of the particles may be rough, smooth or irregular, and may include an added material coating on some or all of the particle.

As used in this disclosure, "carrier fluids" are liquids or gases selected for the purpose of creating a suitable hydraulic crack or fissure within the heat source rock, transporting thermal materials through the wellbore, into and along the created cracks, then dispersing from within the cracks into the surrounding rock to permit the crack walls to close upon the thermal material within. The carrier fluids may contain thickening additives that cause immediate or delayed viscosity development or other additives to subsequently break that viscosity. Further, additives may be included to control spurt-loss and fluid-loss within the fissure during injection and closure.

As used in this disclosure, "compressive mechanical behavior" of a pack of particles in a thermal pathway refers to the determined or measured deformation, failure, and packing characteristics of the particles subjected to operating stress and temperature. Compressive mechanical behavior is influenced by various factors including, but not limited to, the plasticity, stiffness, compressive strength, and packing characteristics of the particulate material. In addition, the compressive packing characteristics of particles depend on factors such as size, size distribution, shape, and roughness.

As used in this disclosure, "particle pack failure strength" refers to the stress level at which cracking and failure of particles within a particle pack predominantly occurs. Compressive particle failure is influenced by the mechanical strength of the particle material combined with inter-particle stress points where the contact between particles is defined by the dimensional characteristics and packing of the particles.

As used in this disclosure, "particle dimensional characteristics" refers to the physical properties of the particles used, including, but not limited to, their size, size distribution, shape, and roughness.

As used in this disclosure, "compressive strength" means the maximum compressive stress that a given solid material can withstand without breaking under a gradually applied load.

As used in this disclosure, "initial closure" means a zero-stress condition on the particles, where the surrounding rock just comes into contact with the placed particles at the initial packing solid volume fraction during fissure closure or openings closure.

As used in this disclosure, "closure stress" or "thermal pathway stress load" means the stress load on the particle pack when the contained particles fully support the stresses (namely, are fully compressed or closed) within the crack, fissure, or opening created within the heat reservoir.

As used in this disclosure, "particle pack" refers to the pack of thermal particles in the opening of the subterranean heat reservoir after the slurry is injected into the opening. When the "particle pack" is fully compressed or closed in the opening, it becomes "thermal pathway". "Particle pack stress load" refers to the stress load applied on the particle pack.

As used in this disclosure, "full closure" refers to the particle packing condition within the crack, fissure or opening where the placed particles are subjected to the full closure stress of the heat reservoir. "Full closure stress" refers to the stress when the particle pack is fully compressed or closed.

As used in this disclosure, "particle pack volume fraction" represents a ratio of a volume of thermal particles to a volume of the thermal pathway.

As used in this disclosure, "initial particulate volume fraction" or "initial packing solid volume fraction" represents the volume fraction of packed particles (particle pack volume fraction) under zero stress in the opening.

As used in this disclosure, "pack conductivity" describes the thermal conductivity of a particle pack in a thermal pathway. It indicates the effective conductivity of the thermal material used to fill the opening. A higher pack conductivity ensures better thermal conduction along the pathway.

As used in this disclosure, fissure width describes the distance between the surfaces of a crack, fissure or opening throughout opening, injection and closure.

Enhancing Geothermal Recovery in a Subterranean Heat Reservoir

Figure 1:
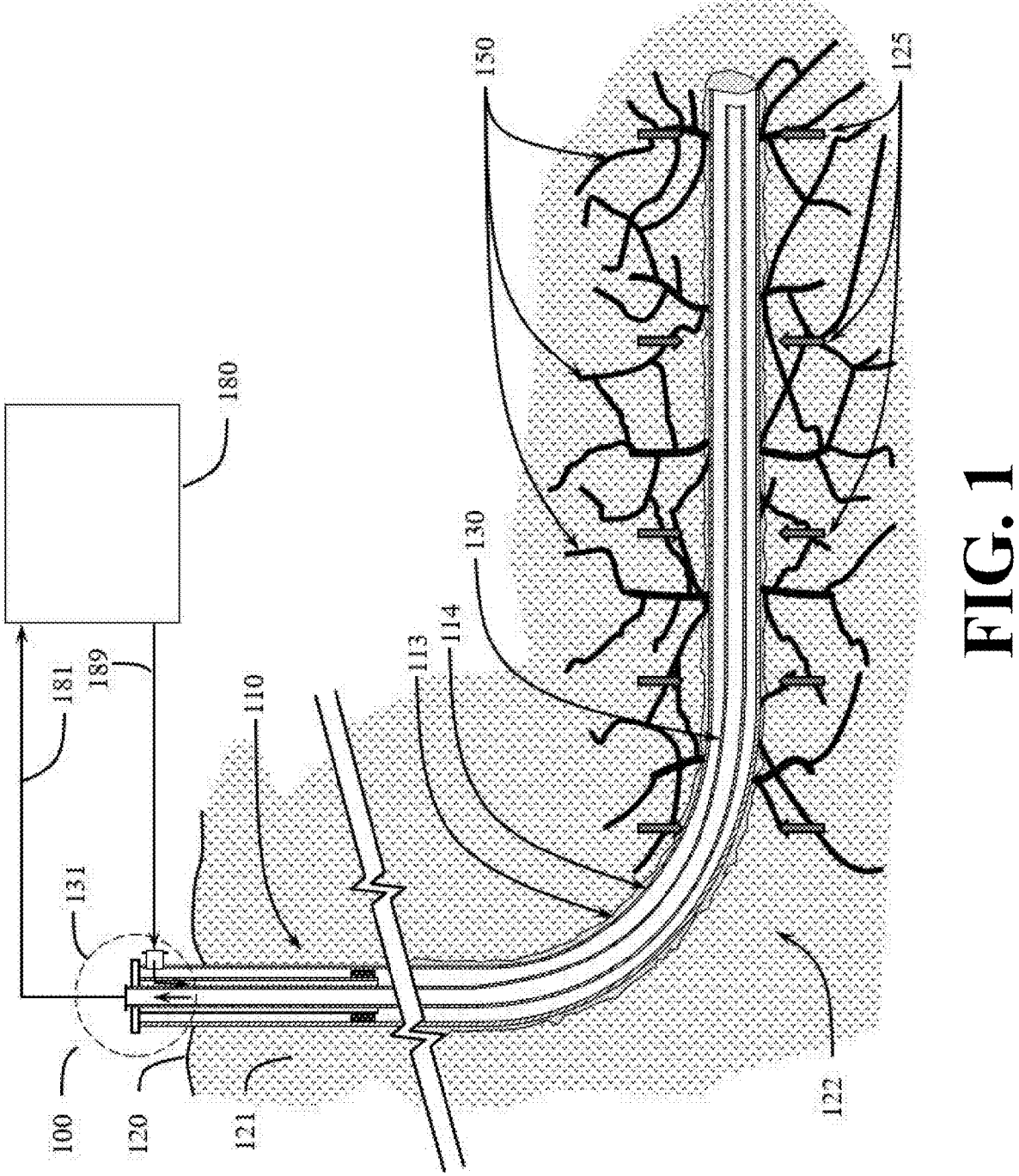
FIG. 1 is a schematic side sectional view of a closed-loop geothermal recovery system according to an embodiment of the present disclosure.

Referring to FIG. 1, and according to an embodiment of the present disclosure, a closed-loop geothermal recovery system comprises a wellbore 110 penetrating a subterranean rock formation having an elevated temperature of at least 10° C. above the surface ambient temperature. The wellbore 110 is thermally coupled to a thermal fluid circulating sub-system 180 for capturing geothermal energy by circulating a thermal fluid between the surface and the wellbore 110. The captured geothermal energy can be converted into electricity or other energy using known means, such as a steam turbine (not shown) thermally coupled to the thermal circulating subsystem 180. The thermal circulating subsystem 180 in this example may have any configuration as long as the thermal fluid can be circulated into and out of the heat reservoir through the wellbore 110. The wellbore 110 is shown penetrating the earth 120 into a subterranean heat reservoir 122, and is hydraulically isolated from surrounding thermal and heat reservoirs. The wellbore 110 comprises a casing string conduit 114 at least partially surrounded by a sealing material, such as cement 113, to provide hydraulic isolation between the subterranean formations and mechanical support. The casing string conduit 114 may comprise a plurality of continuous or overlapping conduits, including a surface casing, an intermediate casing, a production casing, and a liner (not shown). The wellbore 110 is hydraulically isolated from the surrounding heat reservoir 122 and thermally coupled to the higher temperature reservoir rock to allow heat flow 125 into the wellbore 110. The heat flow 125 is enhanced by highly thermally conductive thermal pathways 150 to transfer heat from the subterranean heat reservoir 122 or surrounding rock to the wellbore 110.

An inner tubing string 130 is placed within the wellbore 110 and within the casing string conduit 114 to allow injected thermal fluid to flow within the annular space created by the placement of the inner tubing string 130, to be heated by the subterranean heat reservoir 122, and to recover the injected thermal fluid to the surface. Circulating fluids may include liquids or gases suitable for transport of heat from the reservoir to the surface such as water, water-glycol mixtures, light hydrocarbons (C2 to C8, referring to the number of carbon atoms in the molecule), ammonia, alcohols, carbon dioxide and refrigerants or mixtures thereof as selected for specific well conditions or surface energy processing and application.

The inner tubing string 130 has a length from the surface into the wellbore to cause the injected thermal fluid to flow within the annular space, and is thermally insulated to minimize heat loss from the thermal fluid being recovered within the inner tubing string 130 to the cooler fluid being injected through the annular space. The wellbore 110 terminates at the surface with a wellhead 131 configured to allow thermal fluid injection 189 into the annular space of the wellbore 110 and recovery 181 from the inner tubing string 130, and to direct injected fluids to appropriate flow paths within the wellbore. Various circulating configurations may be used for injection and recovery of the thermal fluid, including circulation into a wellbore wholly or partially within an inner tubing string with recovery wholly or partially through an annular space, a U-shaped path formed within a single wellbore, or created by hydraulically connecting multiple wellbores to allow circulation. In all cases, the circulating fluid is transported to access the thermal pathway for being heated and subsequently recovered.

In one embodiment, the thermal pathway 150 may be created by injecting a slurry into openings in the subterranean heat reservoir. The openings may be either naturally occurring openings in the subterranean heat reservoir or created by pressurizing the initial fluid into the heat reservoir. Injection of an initial fluid may be performed prior to or immediately prior to the injection of the slurry. With a method for enhancing geothermal recovery according to an embodiment that is described below, the thermal conductivity of the resulting thermal path way can be enhanced, thereby improving energy production.

FIG. 2 illustrates a method for enhancing geothermal recovery in a subterranean heat reservoir according to an embodiment described herein. At step 201, a thermal pathway stress load, defined by an obtained reservoir stress and a pore pressure of the subterranean heat reservoir where the thermal pathway is to be formed, is determined. The thermal pathway stress load (also referred to as crack or fissure closure stress, or simply closure stress in the context of the disclosure) is the difference between the minimum horizontal stress (also referred to as reservoir stress in the context of the disclosure) and the pore pressure in the heat reservoir surrounding the crack or fissure, which will be discussed in more detail below. The closure stress or closure pressure is approximately equal to the effective minimum horizontal stress minus the in-situ pore pressure where injection volume is insufficient to alter the near field pore pressure. Pore pressure is the pressure of fluids in the pore space of rock. Pore pressure within a heat reservoir may be determined a number of ways. Commonly, pore pressure is determined with the use of pressure gauges placed on or into a wellbore in hydraulic communication with the heat reservoir. Alternatively, pore pressures can be acquired from the interval during drilling using sidewall formation testers or repeat formation testers. Otherwise, an estimate of pore pressure can be acquired from a database of initial reservoir pressures for the interval documented for nearby wellbores. Closure stress equals the pressure at which cracks, fissures or other kinds of openings in a reservoir close after the injection pressure is diminished. Closure pressure can be determined by a pump in and shutdown sequence. Sufficient fluid is first injected into an interval of interest to establish a crack or fissure within the rock. Injection is then ended and the pressure monitored and analyzed until the pressure response indicates the created opening is closed. One such analysis methods is called a Nolte Analysis. However, it is appreciated that the determination of reservoir stress and pore pressure at step 201 are well known in the art and do not necessarily require measuring in the field where data of a subject subterranean formation may be obtained from other available sources, such as a database of previous measurements.

At step 202, a target thermal conductivity and target dimensions of the thermal pathway are set. Thermal conductivity is a measure of a material's ability to conduct heat. It is defined as the amount of heat that can be transferred through a unit area of a material in a unit time when there is a temperature gradient between the two surfaces. The thermal conductivity of a material is affected by various factors such as temperature, density, and chemical composition of the material. However, it is appreciated that the selection of the target thermal conductivity at step 202 refers to a thermal conductivity that has a desirable value so that the thermal pathway can conduct heat efficiently. The target dimensions of the thermal pathway refer to the length, width, and height of the thermal pathway after the closure, in particular to the length and width. The target thermal conductivity and target dimensions of the thermal pathway after closure determine the ability of the thermal pathway to conduct heat.

At step 203, a volume of thermal particles is selected, which has a material composition and physical properties that allow the volume of thermal particles to form the thermal pathway and provide a particle pack thermal conductivity under the determined thermal pathway stress load that meets or exceeds the target thermal conductivity. The material composition refers to the composition of the thermal particles, which may include one or more different materials or alloys. The physical properties may refer to one or more of particle size (diameter or longest dimension), particle shape, solid volume (the amount of space occupied by the solid phase), and material thermal conductivity. The carrier fluid are selected to be compatible with the thermal particles.

At step 204, a volume of carrier fluid is selected, which has a fluid volume and fluid viscosity that is mixable with the selected pack of thermal particles to produce a slurry that is injectable into openings of the subterranean heat reservoir at an injection pressure higher than the obtained reservoir stress to form the thermal pathway with the target dimensions after closure. The use of the carrier fluid allows the injection of the slurry into the subterranean reservoir, thereby ensuring that the thermal particles can be transported to, and deposited into openings, such as cracks and fissures, in the rock formation. The carrier fluid may also be selected to help reduce the risk of premature settling or agglomeration of the thermal particles. The volume of the carrier fluid is selected based upon the volume of thermal particles to provide a thermal particle volume fraction that is both pumpable and yields the desired initial particulate volume fraction.

In some embodiments, water may be the selected carrier fluid as it also serves to improve the thermal flow over that of in situ hydrocarbons it displaces as a filtrate from openings into the pores surrounding heat source rock. Further, water is readily available and can be reliably viscosified to effectively create, extend and enhance openings into the surrounding heat source rock as well as transport, place and suspend thermal particles deep into openings. However, the choice of the carrier fluid may be dependent upon the particular situation or circumstance. For example, where the objective is to aggregate a thermal solid within an opening, or to place solids into the base of an opening, or to permit rapid closure of the opening, other fluids may prove more effective than water.

At step 205, the selected volume of thermal particles and the selected volume of carrier fluid are mixed to produce the slurry. The slurry provides an efficient means of transporting the thermal particles into the opening to establish a thermal pathway in the subterranean heat reservoir that facilitates the extraction of geothermal energy. It should be appreciated that slurry is used herein to refer to the mixture of the thermal particles and the carrier fluid.

At step 206, the slurry is injected into openings in the subterranean heat reservoir at the injection pressure. By injecting the slurry at a pressure higher than the obtained reservoir stress, openings are created, maintained or enhanced and the thermal particles and carrier fluid can enter and fill the openings and create a thermal pathway for heat transfer. During injection the initial fluid and the carrier fluid may flow from the opening into the pores within surrounding rock by the pressure differential between the interior of the opening and the in-situ pore pressure. The injection pressure of the slurry at surface may range from 1 to 150 MPa, or about 0.1 to 125 MPa higher than the reservoir stress. The injection pressure is held for the duration of the injection determined by the injection volume (the sum of carrier fluid volume and thermal material volume) and injection rate. In a typical setup, the injection process may last for about 5 minutes to 3 hours.

At step 207, the openings containing the slurry are allowed to close to form the thermal pathway. This step comprises ceasing injecting the slurry and allowing at least some of the volume of carrier fluid to leak from the openings into surrounding reservoir until a fluid pressure of the slurry equalizes with the pore pressure of the subterranean heat reservoir. The time from cessation of slurry injection to pressure equalization may range from immediate to several days. The reservoir stress load causes the carrier fluid to leak into the surrounding reservoir, resulting in a better contact between the thermal pathway and the surrounding rock, which in turn increases the efficiency of the energy recovery process. Additionally, the stress load on the thermal particles within the openings may cause the particle-to-particle thermal contact to improve, the particles to more effectively pack for additional contact points, and the particles to deform, crush and fragment to further increase contact and thermal flow capacity within a thermal pathway to increase the efficiency of the energy recovery process.

In an embodiment, the slurry may be injected into the subterranean heat reservoir via a wellbore. The closure of the openings containing the thermal particles may further comprise recovering a portion of the carrier fluid from the thermal pathway and out of the wellbore. In a further embodiment, the method may further comprise hydraulically isolating the thermal pathway from the wellbore after the recovering. The hydraulic isolation refers to the process of creating a hydraulic barrier between the thermal pathway and the wellbore to prevent any unwanted fluid flow or pressure changes. This step may be useful to ensure that the thermal pathway remains intact and functional for future energy extraction operations. One method of hydraulic isolation is to inject a sealing fluid into the wellbore that will set and harden to form a barrier. This sealing fluid can be any suitable material that can set and harden quickly under the prevailing downhole conditions, such as cement, resin, or a polymer gel. Another method is to install a packer or other mechanical barrier in the wellbore to physically block the flow of fluids.

In an embodiment, the openings may be cracks or fissures formed by injecting an initial fluid into the subterranean heat reservoir at a fluid pressure higher than the obtained reservoir stress. The high-pressure injection of the initial fluid initiates a single or network of interconnected fissures or cracks within the rock. The initial fluid, typically the carrier fluid itself, is first injected to initiate or open at least one hydraulic crack or fissure in the rock, at a pressure at least equaling the minimum principal stress on the rock (reservoir stress). Injection is continued to establish the width of the desired crack or fissure such that the slurry containing the thermal material can enter and travel within the fissure or crack without bridging. Once one or more fissures or cracks of sufficient dimension to accept the slurry are created, the thermal material particles are mixed into the carrier fluid to begin slurry injection.

By maintaining a pressure higher than the reservoir stress, the fissures remain open and facilitate the flow of slurry into the fissures to form the thermal pathway. After the thermal pathways are formed, the initial fluid may be pushed into surrounding rocks.

Figure 3:
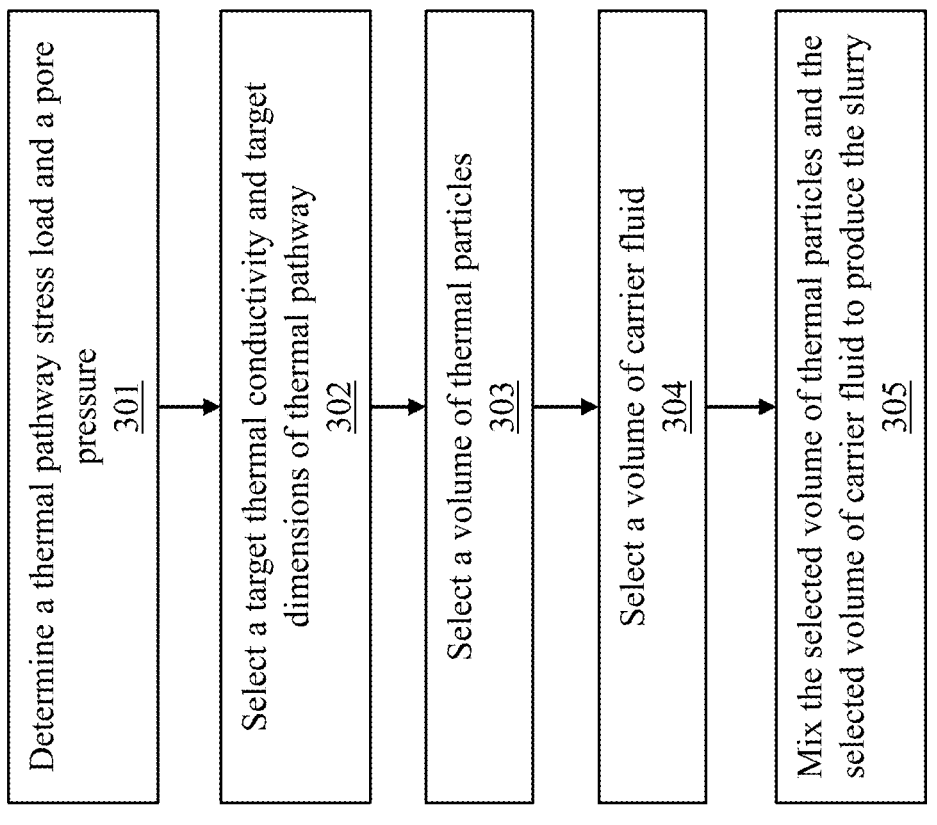
FIG. 3 is a flowchart of a process for producing a slurry for enhancing geothermal recovery in a subterranean heat reservoir according to an embodiment of the present disclosure.

FIG. 3 illustrates a method producing a slurry for enhancing geothermal recovery in a subterranean heat reservoir according to an embodiment described herein. At step 301, a thermal pathway stress load from an obtained reservoir stress and a pore pressure of the subterranean heat reservoir where a thermal pathway is to be formed are determined. At step 302, a target thermal conductivity and target dimensions of the thermal pathway are selected. At step 303, a volume of thermal particles is selected, which has a material composition and physical properties that allow the pack of thermal particles to form the thermal pathway and provide a particle pack thermal conductivity under the determined thermal pathway stress load that meets or exceeds the target thermal conductivity. At step 304, a volume of carrier fluid is selected, which has a fluid volume and fluid viscosity that is mixable with the selected volume of thermal particles to produce the slurry that is injectable into openings of the subterranean heat reservoir at an injection pressure higher than the obtained reservoir stress to form the thermal pathway with the target dimensions after closure. At step 305, the selected volume of thermal particles and the selected volume of carrier fluid are mixed to produce the slurry. Steps 301 to 305 are substantially the same as steps 201 to 205, so their detailed description is omitted.

Figure 4:
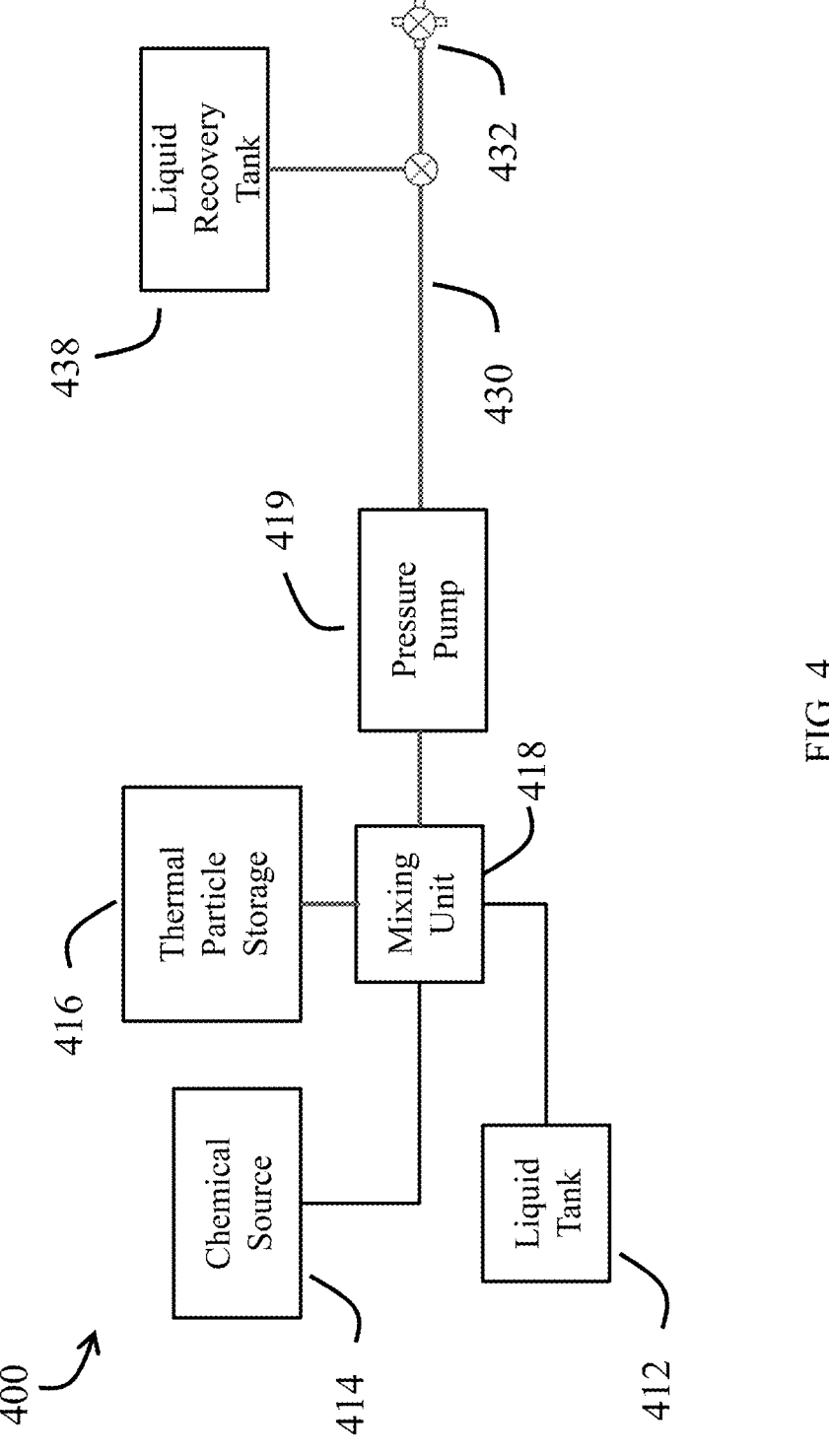
FIG. 4 is a schematic block diagram of a system for improving closed-loop geothermal well performance according to an embodiment of the present disclosure.

An embodiment of a system 400 for improving closed-loop geothermal well performance is illustrated in FIG. 4. The system 400 includes a liquid tank 412 for containing the carrier fluid, a chemical source 414 for containing and applying viscosifying or modifying chemicals, and a thermal particle storage 416 for containing and applying thermal particles. The liquid tank 412, the chemical source 414, and the thermal particle storage 416 are connected to a mixing unit 418, in which they may be mixed to prepare a slurry. The slurry may be fed to a pressure pump 419, by which the slurry is pressurized to be injected to a wellhead 432 through a connecting pipe 430. The slurry is injected down the wellhead 432 into a wellbore to create and fill openings in the subterranean heat reservoir. Alternatively, an initial fluid may be pressurized by the pressure pump 419 to open or initiate fissures in the subterranean heat reservoir. Upon completion of the injection treatment and in the course of closure of the thermal pathway, a portion of the carrier fluid may be directed to a liquid recovery tank 438 and optionally a flow separator (not shown). The treated location within the well may be hydraulically isolated for geothermal recovery, and optionally, communication to the heat rock formation at a different location may be established to provide a series of thermal pathways within the well.

Figure 5:
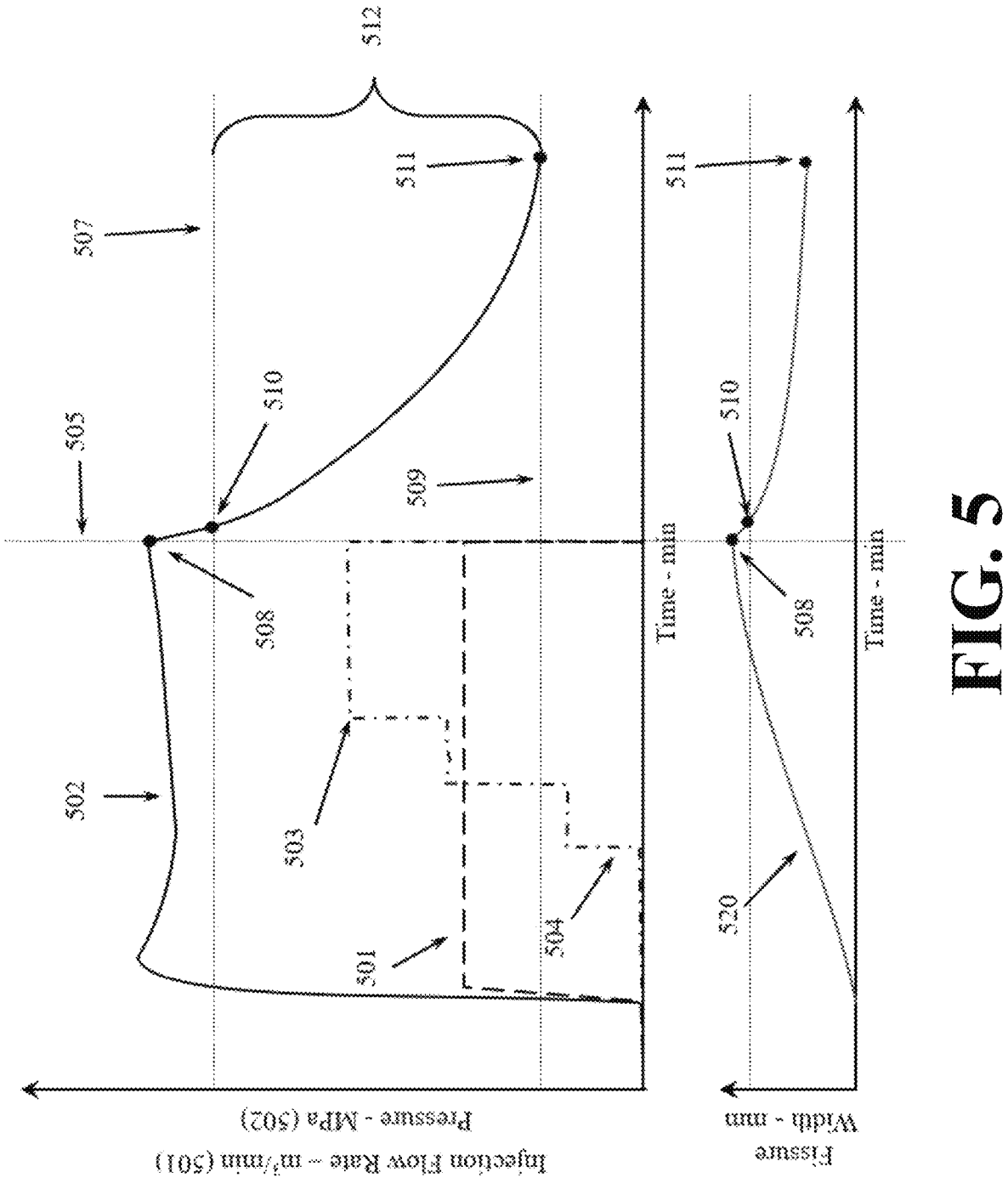
FIG. 5 is a graph illustrating an exemplary process for creating an opening and a thermal pathway in a subterranean heat reservoir according to an embodiment of the present disclosure.

FIG. 5 is a graph illustrating how injection flow rate, pressure, thermal solids added concentration, and fissure width may change over time for creating an opening and a thermal pathway in a subterranean heat reservoir. To begin, an initial fluid is injected at a rate indicated by 501 and pressure sufficient to overcome the reservoir stress to create and propagate at least one opening in a target subterranean heat reservoir. The initial fluid varies depending on factors such as the rock's geology and the desired fissure geometry. Water is a commonly used fluid. Chemicals, such as gelling agents, cross-linkers, and biocides, may also be added to modify water properties. Other initial fluids may include liquefied petroleum gas (LPG), carbon dioxide, and nitrogen. It should be understood that the carrier fluid may be the initial fluid in some examples.

The injection may be carried out by the system 400 described above with respect to FIG. 4. As the injection continues, a slurry is added to the initial fluid stream at a desired volume ratio indicated by 503 or weight concentration, and the injection is continued until the desired dimensions of the fissure are reached and filled with the slurry. In one example, the added concentration of the slurry may be incremental, such as shown in FIG. 5. This means that the slurry is injected into the openings in a plurality of stages with varying ratios of a solid volume of the pack of thermal particles to the fluid volume of the volume of carrier fluid. In this case, the concentration of the slurry may gradually increase in the fluid stream. The injection then ends at 505, and the initial and carrier fluids continue to drain from the openings to initiate closure of the fissure or cracks onto the thermal particulates.

The rock is subjected to three principal stresses: the vertical or overburden stress, the primary or largest horizontal stress, and the minimum horizontal stress. In most applications, the overburden stress is greater than the minimum horizontal stress, resulting in fissures or cracks opening perpendicular to the minimum horizontal stress in a vertical or near-vertical orientation. The opened fissure may be planar or a complex series of connected openings, extending from the wellbore into the heat reservoir in a variety of patterns.

To create a desired fissure width, the initial fluid is first injected to initiate or open at least one hydraulic fissure in the rock, at a pressure at least equal to the sum of the minimum horizontal stress on the rock (as indicated by 507) plus the tensile strength. The minimum horizontal stress indicated by the dashed line 507 is also referred to as the reservoir stress. The injection is continued until the desired width of the fissure as indicated by 520 is established, allowing the slurry containing the thermal particles to enter and travel within the fissure without bridging. Once the desired fissure opening width is reached, the thermal particles are mixed with the carrier fluid (such as by the mixing unit 418 as described with respect to FIG. 4) to form a slurry, which is then injected into the fissure with an incremental concentration as shown by 504 and 503 in the carrier fluid, thus creating the thermal pathway. The incremental concentration ensures a relatively low concentration at the beginning, allowing the thermal particles to enter the fissure without blocking the relatively small entrance to the fissure. As the injection progresses and the width increases, a higher concentration of thermal particles is injected into the fissure to form the thermal pathway.

The minimum horizontal stress can be determined by conducting a wellbore stress test, which involves injecting fluids into the wellbore at a controlled pressure to create a fissure in the rock. Once the fissure or crack is established, injection ceases and the resulting pressure response observed and analyzed to detect the pressure at which the fissure closes. Alternatively, the geology of the surrounding rock formations can be analyzed to determine the orientation and magnitude of the tectonic stresses and the formation's history of deformation, which can provide insight into the minimum horizontal stress magnitude.

For a thermal pathway creation, several factors may determine the dimensions of the hydraulic fissure, including the local geology, adjacent rock mechanical properties, carrier injection rate, slurry viscosity, and injected volume. Within these conditions, a specific fissure opening width exists during the injection. The width of the fissure opening may affect the process of creating the thermal pathway in the following way. First, the fissure width during the injection may limit the particle size and volume fraction that can be applied within the carrier fluid. If excessively large particles are used or the volume fraction is too high, there is a risk of forming unplanned bridging within the fissure, thereby inhibiting the injection by increasing pressures beyond the allowable maximums, and causing the operation to be terminated, resulting in the creation of a smaller thermal pathway than desired. Second, the maximum width of the fissure during the injection at 508 with the volume fraction of particles determines the final closed width of the thermal pathway. During the injection of the slurry, the final width of the thermal pathway at 511 is reduced by the volume of fluid lost from the fissure into the surrounding reservoir pores or into the wellbore, plus the width loss due to bulk volume reduction of the thermal particles due to compression deformation and crushing. The resulting thermal pathway width at

511 is the width of the closed fissure filled with compressed thermal particles and a portion of the carrier fluid as interstitial fluid. The effective thermal conductivity through the pathway is that of the compressed thermal particles within the fissure combined with the interstitial fluid.

In one embodiment, the slurry is injected at a controlled rate, pressure, and concentration to maintain and fill at least one fissure with a selected thermal particles and carrier fluid. The fissure should contain the thermal particles continuously distributed along the length, creating at least one thermal pathway of a certain width and length into the surrounding rock. This pathway conducts the desired heat from the adjacent heat reservoir, through the thermal particles and the interstitial fluid within the fissure, and to the wellbore. Once the desired fissures are created and filled with the thermal particles, the slurry injection ends at 505.

Upon ceasing the slurry injection, the fluid pressure within the fissure at 508 remains higher than the crack closure stress, and the fissure initially remains open, containing the carrier fluid and thermal particles. The fluid, with higher pressure than the pore pressure (as indicated by 509) within the surrounding rock, leaks into the rock and narrows the fissure until the fissure walls contact and begin compressing the contained thermal particles. This process continues until the pressures and stresses within the fissure are equalized with those of the surrounding rock. Initially, the internal fissure pressure at 508 decreases until it matches the crack closure stress shown by 507, where the fissure walls starts contacting at 510 and compressing the previously suspended thermal particles into a pack. As the higher-pressure carrier fluid in the slurry at 510 continues to leak from the fissure into the surrounding rock pores or wellbore, the fissure narrows further, and the thermal particles accept more and more compressive load to support the fissure walls. Eventually, the fluid pressure within the fissure at 511 equalizes with the pore pressure at 509 within the rock, which represents the maximum compressive load placed on the thermal particles. At this point, the fissure wall stresses are supported by the thermal particles, and the supported compressive load is approximately the difference between the minimum horizontal stress (reservoir stress) and the pore pressure. Such a difference is referred to as thermal pathway stress load or closure stress, as indicated by 512 in FIG. 5.

In another embodiment, the fissures in the heat reservoir may be pre-existing, so that the initial fluid can be injected at a pressure that does not include the pressure required to initially breakdown the rock or to overcome the tensile strength of the rock, as indicated by 502. However, the injection pressure must exceed the reservoir stress indicated by 507 for the openings such as cracks or fissures to achieve sufficient width such that slurry can be placed in the fissures.

Figure 6:
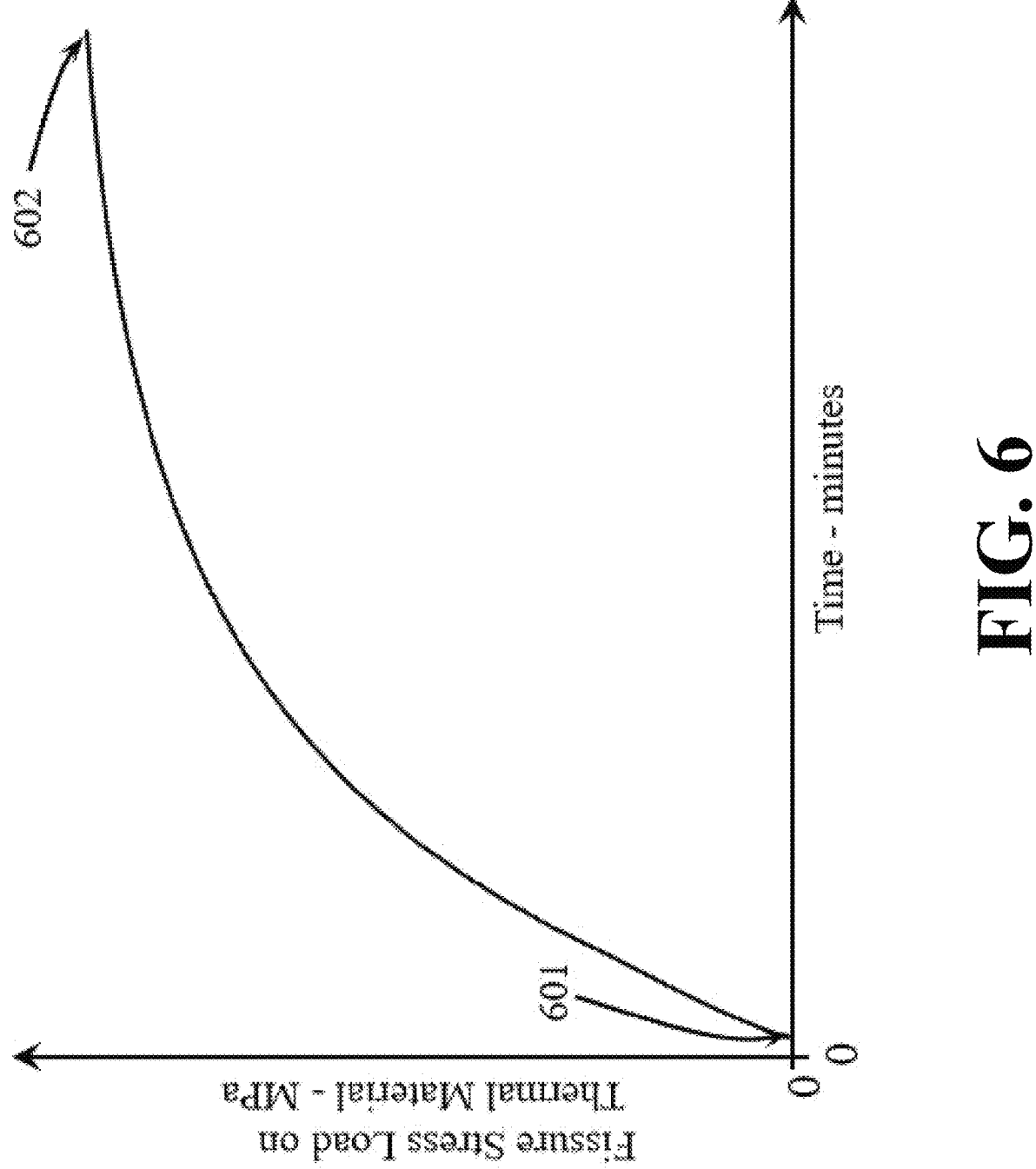
FIG. 6 is an exemplary plot of the stress loads on a pack of thermal particles in fissures of a subterranean heat reservoir, wherein the fissure walls compress the particle pack until reaching stress equilibrium according to an embodiment of the present disclosure.

FIG. 6 illustrates a plot of the stress load on a pack of thermal particles as the fissure walls compress the particle pack until reaching stress equilibrium. The particle pack stress load at a given time is approximately the difference between the minimum horizontal stress (or reservoir stress) and the fluid pressure in the fissure. When the fluid pressure is equal to the minimum horizontal stress, the material load is zero as indicated by 601. At pressure equilibrium between the fissure and the pore pressure, the stress load reaches a maximum as indicated by 602, approximately the difference between the minimum horizontal stress and the pore pressure. The rock stresses on the thermal material may significantly affect the thermal pathway performance. As shown in FIG. 5, the loss of fluid volume from initial contact (as indicated by 510, corresponding to the state indicated by 601 of FIG. 6) to fully compressive load at equalization with the pore pressure (as indicated by 511, corresponding to the state indicated by 602 of FIG. 6) results in a narrower thermal pathway than during the injection (as indicated by 508). Stress on the thermal particles may compress, crack, crumble, crush, or deform the material, decreasing the occupied volume and narrowing the pathway. Although the decreased width reduces thermal flow, the thermal flow depends on multiple factors such as thermal conductivity and dimensions of the pathway and the increase of the thermal conductivity due to the compression may overweigh the reduction of the fissure width.

Figure 7:
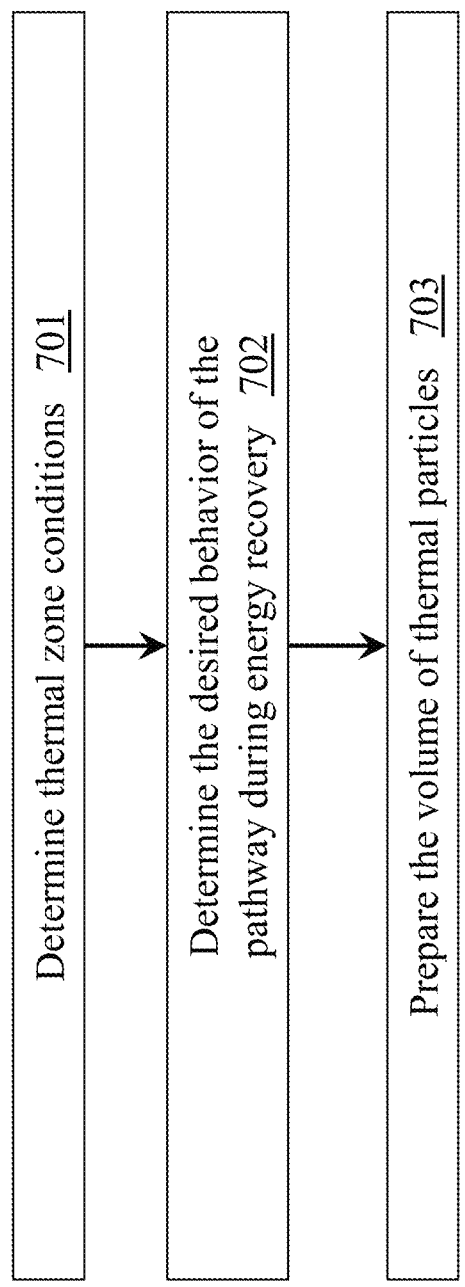
FIG. 7 is a flowchart of a process for preparing a volume of thermal particles according to an embodiment of the present disclosure.

In FIG. 7, a process for preparing a volume of thermal particles is shown. Step 701 involves determining the conditions of the subterranean heat reservoir, such as thermal pathway stress load. Other conditions may be determined as well, such as temperature, rock thermal conductivity, rock density, specific heat, pore pressure, and pressure required to crack the heat reservoir. At step 702, desired behaviors of the thermal pathway during geothermal energy recovery are set, and certain properties of the thermal pathway that are required to achieve the selected behaviors during the pathway creation operation are identified. These behaviors may include a target thermal conductivity and target dimensions of the pathway at closure. Other behaviors may be set as well, such as dimensions of the pathway during the placement of the slurry. The properties required to achieve these behaviors refer to a material composition and physical properties of the type of thermal particle, and may typically include particle thermal conductivity. The properties may also include particle dimensions, particle pack compressive mechanical behavior, carrier fluid viscosity and injection rate, and volume fraction of particles added to the carrier fluid.

At step 703, the volume of thermal particle is prepared. Based on the desired volume of thermal particles, the carrier fluid, particle concentration, and injection rate are chosen, and the slurry mixture may be prepared with the selected carrier fluid and thermal particles with the particle concentration, which is then injected into a well at the injection rate. Finally, the well is shut in to permit the carrier fluid to leak from the fissure to the surrounding heat reservoir, or a portion of the carrier fluid is recovered, thereby closing the fissure on the injected particles to form the thermal pathway with the selected behaviors at the reservoir temperature and stress during thermal recovery operations.

In one embodiment described herein, there is also provided a method for achieving a target width of a thermal pathway formed in a subterranean heat reservoir. At the beginning, an initial fluid is injected into the subterranean heat reservoir at an initial pressure higher than an obtained reservoir stress to create an opening in the subterranean heat reservoir. The opening has an opening width. The initial fluid may be water, for example. Then, a slurry comprising a volume of thermal particles and a volume of carrier fluid is injected into the created opening to form a particle pack in the opening. The volume of thermal particles may be prepared according to the method described with respect to FIG. 7, for example.

Then, the method allows an increase in particle pack volume fraction of the particle pack under a particle pack stress load within the opening as the particle pack is compressed in the opening by ceasing injecting the slurry. The particle pack stress load is determined from an obtained reservoir stress and a fluid pressure of the slurry in the opening.

Finally, the method ensures that a combined effect of the opening width in response to the particle pack stress load increasing to a full closure stress and the increase in the particle pack volume fraction achieves or exceeds the target width of the thermal pathway. The target width is achieved by determining particle dimensional characteristics and compressive mechanical behaviors of the thermal particles and an initial packing solid volume fraction of the injected thermal particles to ensure the increase in particle pack volume fraction meets a predetermined condition in response to the particle pack stress load having increased to the full closure stress by which the particle pack becomes the thermal pathway.

In one embodiment, the increase in particle pack volume fraction of the particle pack may be achieved by allowing at least some of the volume of carrier fluid to leak from the opening into surrounding reservoir or a wellbore until the fluid pressure of the slurry equalizes with a pore pressure of the subterranean heat reservoir.

In one embodiment, the predetermined condition may be an initial closure width multiplied by a ratio of the initial packing solid volume fraction to a full closure solid volume fraction being equal to or greater than the target width. This relationship may be represented by Initial Closure Width× (Initial Packing Solid Volume Fraction/Full Closure Solid Volume Fraction)≥Target Width.

In one embodiment, the particle pack stress load may be determined by subtracting the fluid pressure from the obtained reservoir stress as the particle pack is compressed in the opening. This relationship may be represented by Particle Pack Stress Load=Obtained Reservoir Stress-Fluid Pressure.

Figures 8A, 8B:
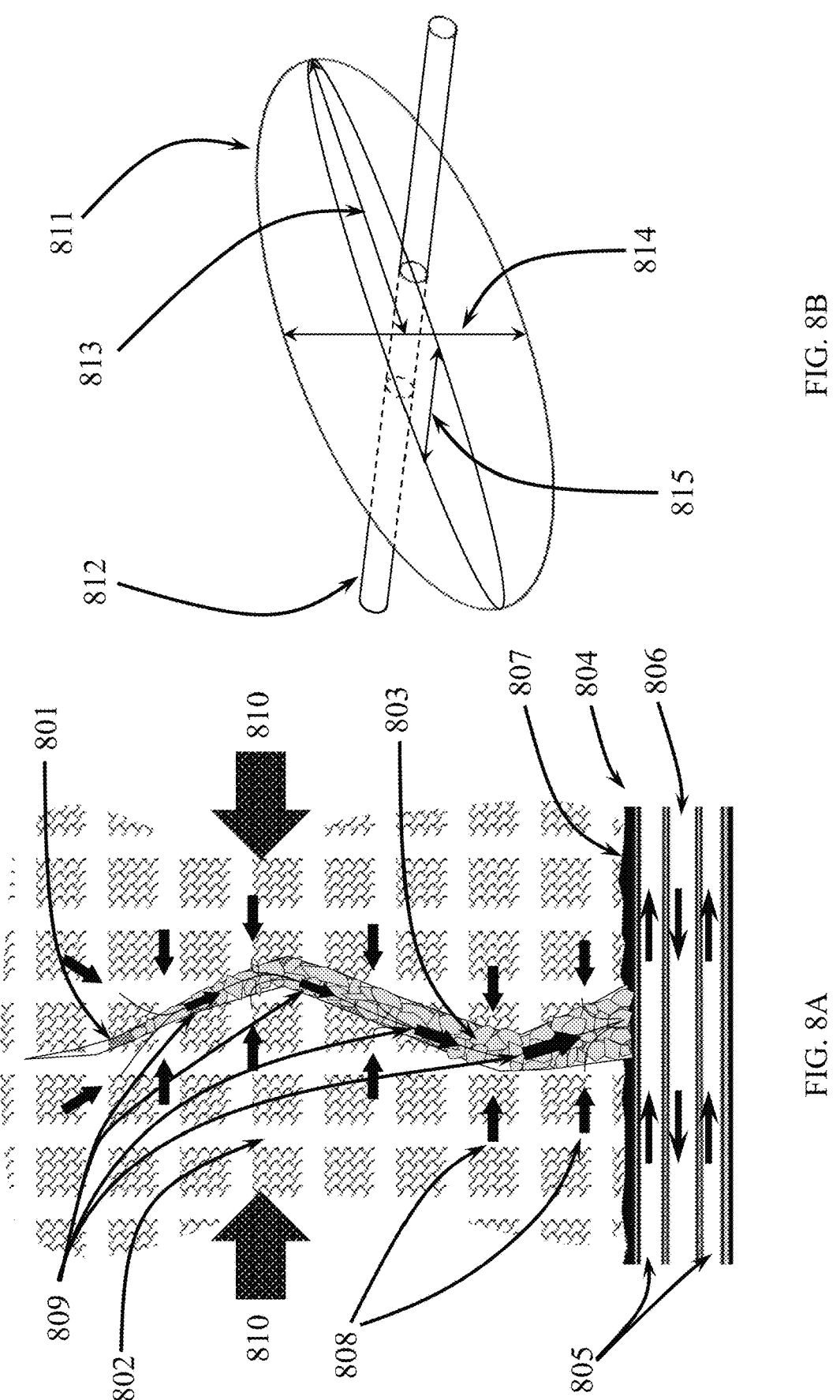
FIG. 8A is a schematic plan view of a thermal pathway configuration within a subterranean heat reservoir, and FIG. 8B schematically illustrates a thermal pathway with a geometry and an orientation intersecting a horizontal wellbore according to an embodiment of the present disclosure.

FIG. 8A depicts a plan view of a thermal pathway configuration within a subterranean heat reservoir 802. The created and closed pathway 801 contains placed thermal particles 803 and is thermally coupled to, and hydraulically isolated from, a wellbore 804. The thermal particles balance the minimum horizontal stress (as indicated by arrows 810) perpendicular to the fissure walls of the thermal pathway. Within the wellbore 804, a thermal fluid suitable for carrying geothermal energy circulates in the annular space 805 and is heated, while heated thermal fluid flows in the inner insulated tubing 806 to the surface. Heat flows from and through the reservoir rock, as shown by heat flow arrows 808, into the thermal pathway 801, along the thermal pathway through the packed thermal particles 803, as shown by heat flow arrows 809, to the highly thermally conductive hydraulic isolation material 807, and then into the wellbore conduit. The highly thermally conductive thermal particles 803 within the thermal pathway 801 exhibits a higher heat conductivity than the heat reservoir and serves to draw heat from deep within the reservoir to improve heat flow into the circulating cool thermal fluid in the annular space 805. In order to provide additional heat to the cool thermal fluid, thermal flow through the thermal flow path is higher than heat flow through the heat reservoir.

The heat flow along the thermal pathway to the wellbore is perpendicular to the primary compressive stress 810 placed upon the thermal particles 803. The lateral stress between the thermal particles may be some portion less than the primary compressive stress 810, depending on the particle packing arrangement within the thermal pathway, confinement of the particles within the fissure, and the mechanical properties of the thermal particles. With reduced stress in the lateral direction, the transverse inter-particle stress may be lower, for example by 50% or more, than the axial compressive stress. Due to this reduced stress, the lateral conductivity within the thermal pathway, particularly those benefits from load deformation, may be reduced and anisotropic thermal behavior within the pathway may be exhibited. The orientation of the pathway conductivity reduction is along that of the thermal flow path, which serves to draw heat from deep within the heat reservoir rock towards improved heat flow into the circulating cool fluid.

FIG. 8B illustrates a thermal pathway 811 with a geometry and an orientation intersecting a horizontal wellbore 812 with a length 813, height 814, and width 815. In this instance, the minimum horizontal stress may be parallel to the wellbore, and the pathway orientation may be perpendicular to that stress. In a horizontal well with the wellbore perpendicular to the minimum horizontal stress, the pathway orientation may be parallel to the wellbore. Vertical well pathways may be oriented vertically from the wellbore and perpendicular to the minimum horizontal stress.

It is appreciated that the term "fissure width" describes the distance or clearance of the fissure and is typically the smallest dimension of the fissure. When the slurry is injected into the crack, fissure or other forms of openings, the width of the fissure is the limiting factor to the size of the particles that can placed into the opening without bridging. Although the width shown in FIG. 8B is illustrated in a horizontal dimension, it can be a vertical or inclined dimension in some other configurations.

Properties of the Thermal Particles

The present disclosure relates to a slurry used in openings or the fissure of the subterranean heat reservoir to create a thermal pathway. The slurry is transported into the openings or the fissure and comprises thermal particles. The thermal particles may be in the form of grains, powders, pellets, flakes, fragments, or scraps and may have shapes that range from spherical to irregular, plates, and fibers. The size of the thermal particles may be small enough to enter the fissure and not bridge across the width of the fissure, which may cause a restriction in flow and prematurely end the injection of the slurry.

The composition of the thermal particles may be any single material or a mixture of materials exhibiting a thermal conductivity of at least 15% greater than that of the surrounding heat source rock. The thermal particles may also exhibit a physical behavior that ranges from soft, plastic, malleable, or deformable to brittle, hard, breakable, fragile, or stiff, or may be a composite of materials with a range of behaviors. Moreover, the surface of the particles may be rough, smooth, or irregular, and may include an added material coating on some or all of the particles.

The thermal particles may be selected from a group consisting of metals, metal alloys, graphite, and silicon carbide. TABLE 1 presents thermal properties of some included thermal materials, while TABLE 2 presents their mechanical properties. It is noted that extensive industry information exists relating to bridging and aggregation blocking within fissures. Therefore, the dimensions of the particles being consistent or distributed and ranging from nanometers to centimeters could be useful to avoid bridging.

TABLE 1

Thermal properties of materials of some thermal particles

| Material | Thermal Conductivity (W/m*K) | Thermal Diffusivity (mm2/s) | Specific Heat (J/kg*K) | Density (kg/m3) |
|---|---|---|---|---|
| Graphite Sheet (In-Plane) | 700-1600 | 896 | 850 | 2,100 |
| Carbon Diamond | 544 | 306 | 506 | 3,510 |
| Silicon Carbide (Single Xtal) | 490 | 225 | 678 | 3,210 |

TABLE 1-continued

Thermal properties of materials of some thermal particles

| Material | Thermal Conductivity (W/m*K) | Thermal Diffusivity (mm2/s) | Specific Heat (J/kg*K) | Density (kg/m3) |
|---|---|---|---|---|
| Silver | 427 | 172 | 236 | 10,500 |
| Copper | 397 | 116 | 385 | 8,940 |
| Gold | 318 | 129 | 128 | 19,300 |
| Carbon Graphite (Typical) | 167 | 105 | 707 | 2,250 |
| Aluminum | 226 | 91 | 921 | 2,698 |
| Tungsten | 197 | 76 | 134 | 19,300 |
| Commercial Bronze | 188 | 57 | 377 | 8,800 |
| Beryllium | 184 | 54 | 1841 | 1,848 |
| Silicon Carbide (Kt Grade) | 180 | 86 | 678 | 3,100 |
| Magnesium | 151 | 86 | 1004 | 1,740 |

TABLE 2

Mechanical properties of some materials of the thermal particles

| Material | Elastic Modulus GPa | Compressive Strength MPa | Poisson's Ratio — |
|---|---|---|---|
| Carbon Graphite (Typical) | 27.6 | 345 | 0.23 |
| Copper | 133 | 330 | 0.35 |
| Silicon Carbide | 410 | 3900 | 0.14 |
| Aluminum | 72 | 31.5 | 0.36 |
| Tungsten | 405 | 3500 | 0.37 |

It should be noted that there is a distinct difference in apparent mechanical behavior between the parent material and the particles within a particle pack. The term "parent material" refers to the original, intact material from which the particles in the particle pack are derived. The transmission of stress through the particle pack occurs at contact points between particles, resulting in the intensification of stress at the small inter-particle contact areas. This stress intensification can cause localized onset of yield, deformation, and failure at comparatively low applied stress levels to a particle pack. For example, even if the parent material has a compressive strength of over 300 MPa, particle failure within a particle pack may occur at loads under 30 MPa.

The shape of the particle is one of the primary factors that may influence stress intensification within a particle pack. Angular particles tend to fail at lower stresses than rounded particles, even if they are made of the same material. Additionally, particle size distribution is another factor, where smaller particles may fail at lower stresses when transmitting loads between larger particles. The packing and repacking of particles under load can also influence the onset of pre-, post-deformation, and failure. Tight particle packing arrangements transmit load more effectively, minimizing early deformation and failure. As the stress load increases, the particle pack will continue to fail, deform, and repack, exhibiting a gradual trend towards the mechanical behavior of the parent material.

Thermal Conductivity of the Thermal Pathway

The present disclosure relates to the formation of thermal pathways, which are composed of a porous packing of thermal particles. The thermal conductivity of the thermal pathway depends on various factors, such as particle physical attributes, fluid within the interstitial spaces, and the application environment. Heat flow through the particle pack is mainly dominated by particle-to-particle conductive flow, which depends on particle conductivity, size, number, area of adjacent contacts, and contact heat flow resistance. The interstitial fluid contributes minor heat flow. Particle size distribution, shape, roughness, and dimensional character also affect the dominant behaviors of the particle pack. The mechanical properties of the material, including strength, toughness, hardness, elasticity, plasticity, tensile strength, shear strength, brittleness, malleability, and ductility, play a significant role in particle packing and the resulting interstitial space (porosity) to affect the inter-particle heat flow. Compressive mechanical behavior expresses the often-complex particle pack behavior under stress, including deformation, cracking, fragmentation, and repacking.

The application environment within the fissure has two primary aspects: stress and temperature, which may alter particle behaviors. The stress load on a particle within a fissure, found at depths sufficient to achieve desired geothermal temperatures, may be considerable, as high as, or exceeding 60 MPa. Although many desirable thermal materials exhibit compressive strengths well in excess of expected pathway stresses, the transmission of this load through the pack intensifies the stress at the particle contacts resulting in particle deformation and failure well below the material strength thresholds. Elastic or plastic deformation may improve pathway thermal conductivity by increasing gross particle contact areas and surface roughness flattening for lower particle heat transfer resistance. Particle mechanical failure may lead to cracks within more malleable particles or fragmentation in brittle particles. These effects increase the number of surfaces for particle heat transfer resistance and make for a more tortuous flow path through the particle pack, which impairs thermal conductivity.

In the context of geothermal applications, the present disclosure considers the effects of temperature, changes to the mechanical behavior, thermal conductivity, and chemical stability of thermal particles. At elevated temperatures such as 100, 200 or 300° C., the yield and ultimate strength, as well as elasticity and malleability, may change significantly from those observed at surface conditions. Consequently, the particle behaviors under stress may be altered. The thermal conductivity of thermal particles also changes with temperature, and these variations may be taken into account. An increase in conductivity may lead to better efficiency, whereas decreased conductivity may have an adverse effect on efficiency, thus affecting the performance of energy recovery. Chemical stability is also a factor at the temperature and in the surrounding environment of interest, particularly in subterranean heat reservoirs containing hot, saline water or acidic gases such as carbon dioxide and hydrogen sulfide.

The thermal conductivity of a particle pack is influenced by various factors, including particle size, shape, surface, and size distribution, as well as axial stress. Simple correlations have been identified that can estimate particle pack conductivity with sufficient accuracy for screening purposes. These correlations are typically based on spherical, well-sorted grains, and have been shown to provide indicative results. One such correlation is that of Argento and Bouvard, as presented in E. E. Gonzo's "Estimating correlations for the effective thermal conductivity of granular materials", Chemical Engineering Journal 90 (2002) 299-302, May 2002. This particular correlation takes into account the thermal conductivity of the parent and interstitial materials, as well as the porosity of the particle pack, including the initial packing porosity, which is relevant to axial load behaviors.

Notably, within a fissure, the particle pack forming the pathway will have a specific porosity at a supported compressive load where the correlation may be used to estimate thermal conductivity. However, porosity-based correlations do not take into account particle size, the number and area of adjacent contacts, and contact heat flow resistance, all of which also impact thermal conductivity. To obtain reliable values for use in applications, particle pack thermal conductivity may be determined through laboratory testing at temperature and load conditions using samples of the actual particles.

Pathway Widths

During the creation of a thermal pathway, there are three aspects related to fissure width that may affect the result of energy recovery. The first aspect is that the width of the fissure should be large enough during injection to allow for thermal particle transport along the fissure without any unplanned bridging or particle aggregation blocks. The term "bridging" refers to the phenomenon where particles or materials become stuck in a narrow or constricted space, forming a barrier that prevents the movement or flow of other particles or fluids. A general rule to manage bridging and blocking is to achieve an opening-to-particle diameter ratio greater than 3. The second aspect is the initial closure width, which is the width at which the fissure walls just begin to load the thermal particles during closure when the internal fissure pressure is in balance with the minimum horizontal stress. At this time, fluid only exists within the porosity of the particle pack, and additional width loss occurs due to the compression of the contained particles as the interstitial fluid flows into the surrounding rock to equalize with the pore pressure. The closed fissure width is the third aspect that needs to be considered during the creation of a thermal pathway. As previously mentioned, the closed thermal pathway width affects the heat flow through a pathway.

Simulation software, such as the Gohfer Fracture Modeling Software, may be used to calculate the dimensions of induced subterranean cracks and fissures, including the placement of particles within the fissure, for almost any application. Inputs to such software include fissure geometry and shape, reservoir and rock properties, injection fluid properties, particle properties, and injection schedule. Output from the software includes fissure width and length during injection, particle distribution within the fissure, and fissure dimensions at closure. In particular, a good characterization of the reservoir rock helps to obtain accurate modeling results. This information is often obtained through various well logging techniques and reservoir injection tests.

Simulations

The following simulations are for illustrative purposes only and are not intended to limit the scope of the disclosure or claims.

Commercially available finite element analysis models, such as LISA V. 8 FEA, May 2013 by LISA-Finite Element-Technologies (with an integrated modeler, multi-threaded solver and graphical post-processor), may be used to perform transient thermal flow simulations. To simulate pathway performance, the model can be configured to use a horizontal wellbore with a sandstone heat reservoir rock that has 8% water-filled porosity and an overall thermal conductivity of 2.7 W/m·K, with an initial temperature of 140° C. The simulation can use a wellbore temperature of 57° C., which would be consistent with a circulating heat transfer fluid, and a heat transfer resistance of 130 W/m²·K, representing the conductive and convective thermal wellbore resistance into the circulating fluid. The simulated pathways can have an orientation and geometry similar to that of FIG. 8B, with a height equal to length and centered and perpendicular to a horizontal wellbore. The simulation is completed to illustrate a 30-year time period.

Figure 9:
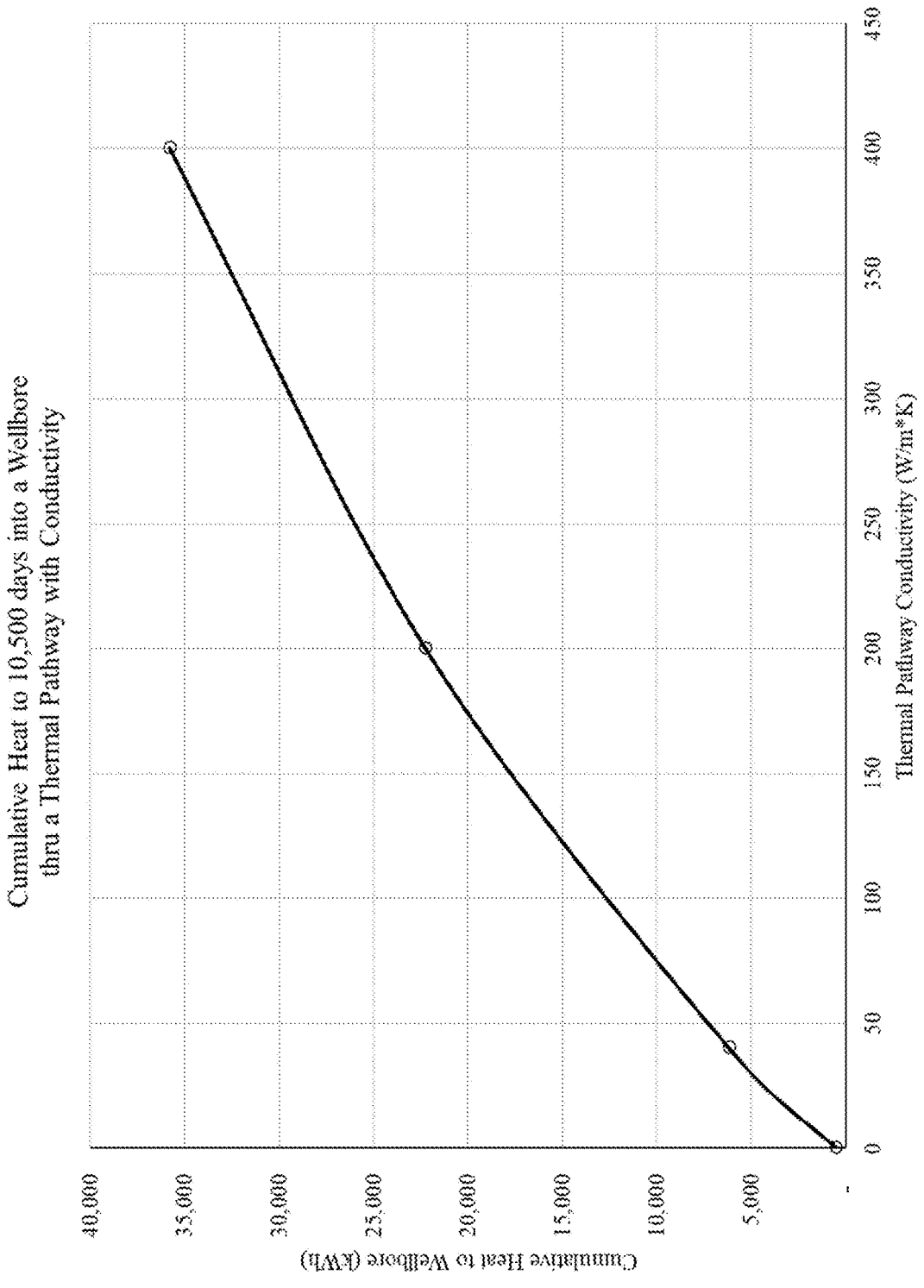
FIG. 9 is a plot of the simulated thermal pathway conductivity and the capacity to transmit heat through a pathway, with the cumulative heat to 10,500 days through a 20 mm pathway at a length of 5 m for various pathway conductivities, according to an embodiment of the present disclosure.

To determine the heat flow rate to the wellbore through the thermal pathway, the simulation may consider the length and conductivity within the flow path and the cross-sectional flow area. FIG. 9 shows the thermal pathway conductivity and the capacity to transmit heat through a pathway, with the cumulative heat to 10,500 days through a 20 mm wide pathway at a length of 5 m for various conductivities. TABLE 3 provides the numerical values. The data at "None" represents performance where no pathway exists, and the reservoir rock conductivity of 2.7 W/m·K is applied. Although not optimized for length or width, FIG. 9 still illustrates the importance of pathway conductivity, with the 400 W/m·K conductivity yielding almost six times the heat from that of the 40 W/m·K pathway.

TABLE 4

| Cumulative Heat to 10,500 days thru a Thermal Pathway with Conductivity (kWh) | |
| --- | --- |
| Conductivity (W/m*K) | Cumuative Heat (kWh) |
| None | 546 |
| 40 | 6,217 |
| 200 | 22,258 |
| 400 | 35,763 |

Figure 10A:
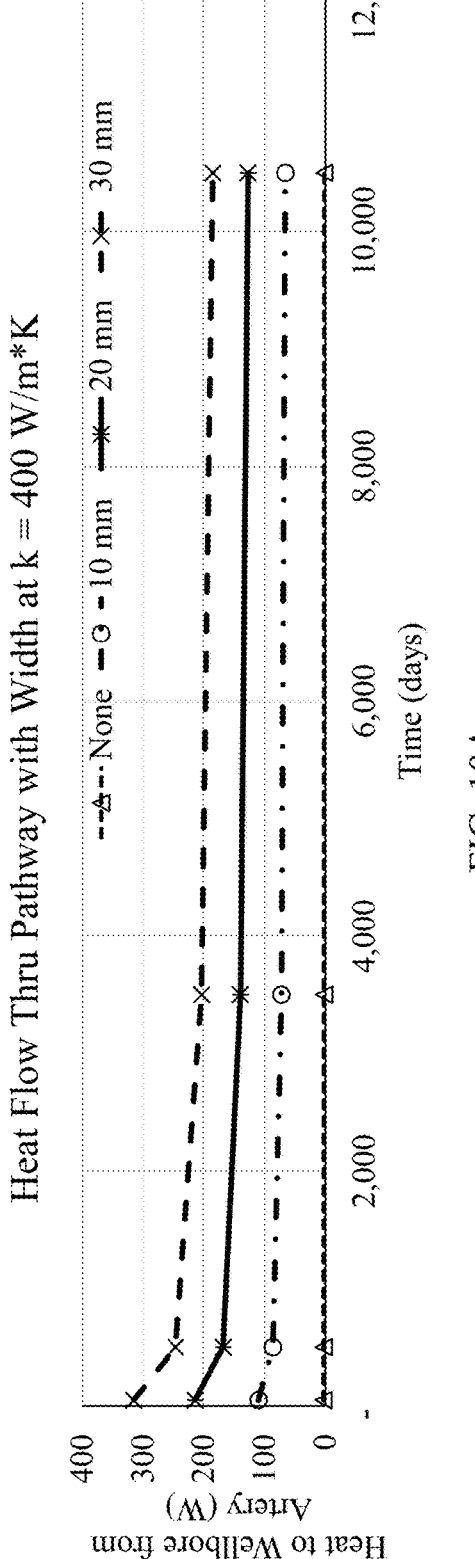
FIGS. 10A and 10B are plots of the simulated transient heat flow performance through thermal pathways of different widths according to an embodiment of the present disclosure.
Figure 10B:
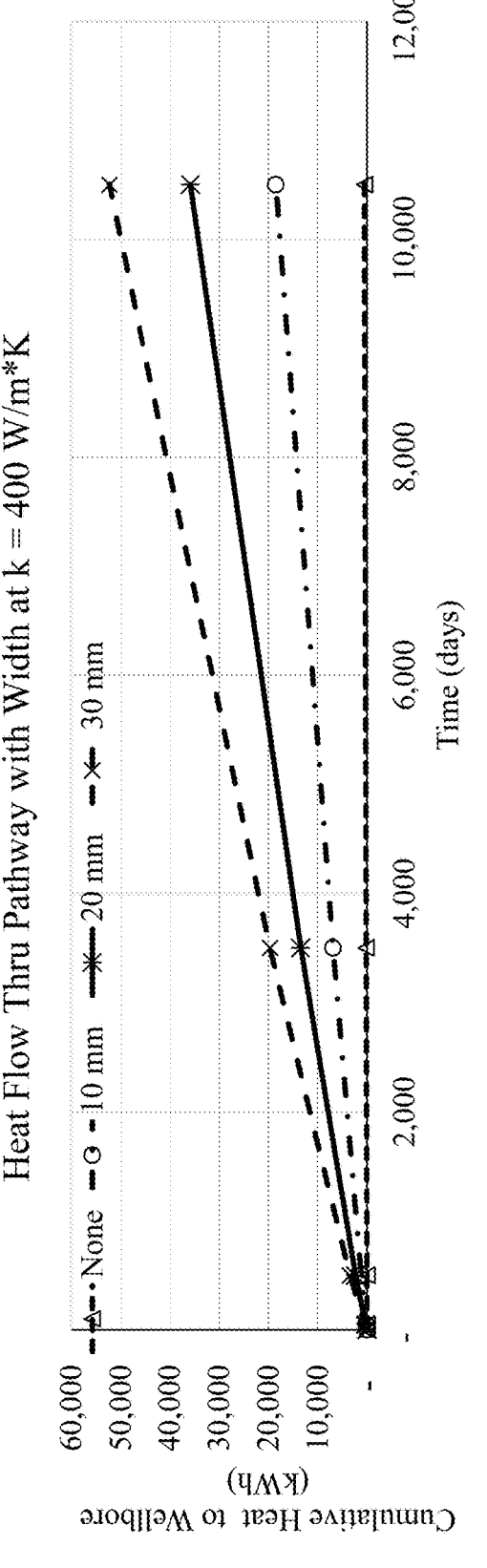

FIGS. 10A and 10B illustrate an example of the transient heat flow performance through thermal pathways of different widths for the well described above. The purpose of this simulation is to observe the effect of pathway width and conductivity on transient heat flow into a wellbore. FIG. 10A shows the heat flow rate from the heat reservoir through a single thermal pathway for various widths over a period of 10,500 days. For this simulation, the pathway length and height are set at 5 m, and the pathway conductivity is 400 W/m·K. The performance of thermal pathways relative to that without a pathway is shown, where the thermal rate through the rock is only a very small fraction of that with pathways. The impact of width on the created pathway indicates a proportional increase in heat flow with increasing widths. The increased pathway performance is sustained over the simulated 30-year period. FIG. 10B provides the cumulative heat flow through the pathways, and TABLE 4 contains the corresponding values.

TABLE 4

| Cumulative Heat Flow thru a Thermal Pathway at Width (kWh) | | | |
| --- | --- | --- | --- |
| | Thermal Pathway Width (mm) | | |
| Time (days) | 10 mm | 20 mm | 30 mm |
| 2 | 7 | 14 | 20 |
| 50 | 161 | 304 | 444 |
| 500 | 1,218 | 2,365 | 3,479 |
| 3,500 | 6,911 | 13,416 | 19,672 |
| 10,500 | 18,484 | 35,763 | 52,276 |

The data from TABLE 4 shows that the cumulative heat flow conveyed through a thermal pathway is dependent on the pathway width. As per the simulation results, increasing the width of the pathway from 10 mm to 30 mm results in a performance gain of 33,792 kWh, which is a 180% improvement over 30 years. This indicates that the performance of the pathway is dependent on its width.

Figure 11:
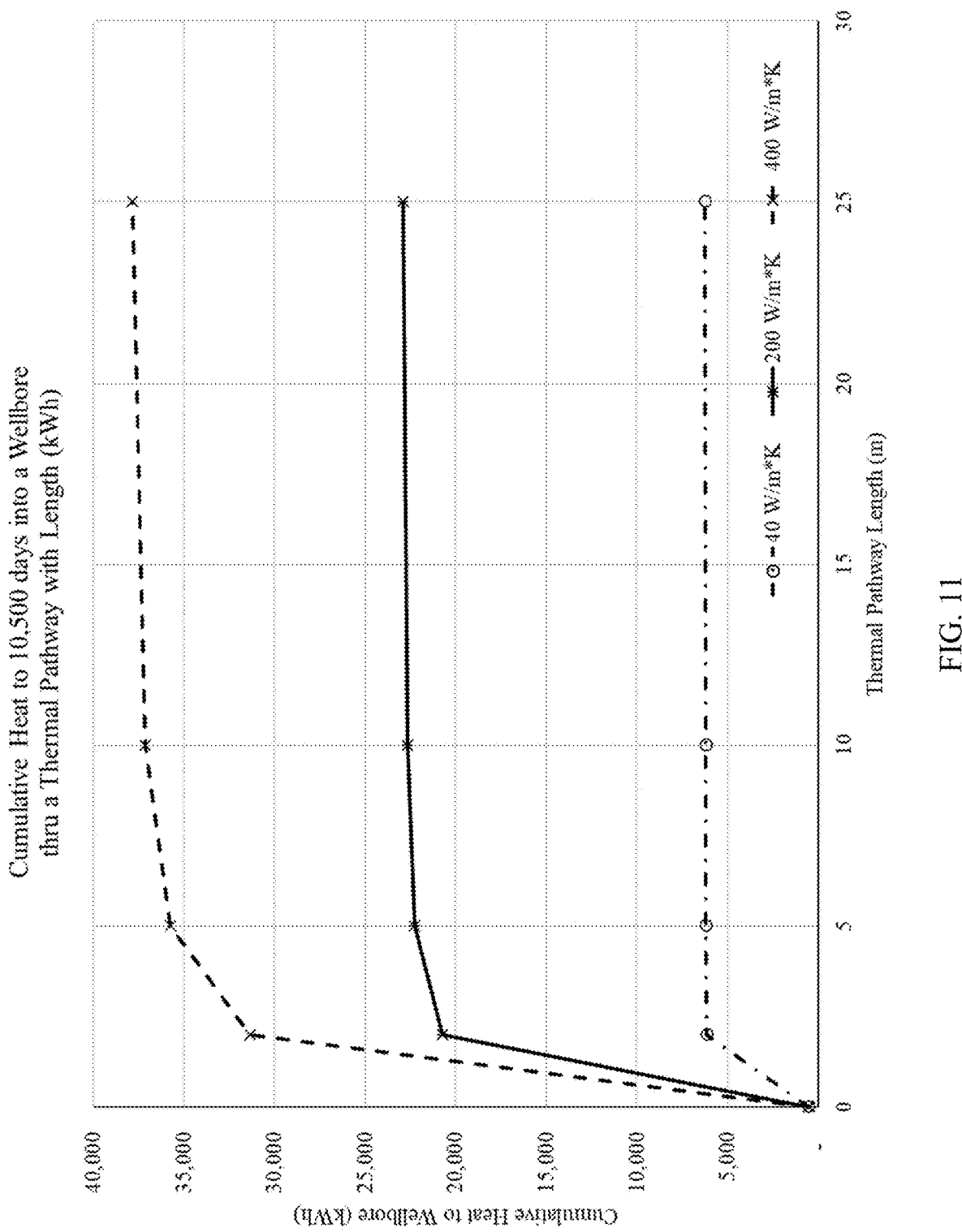
FIG. 11 is a plot of the simulated cumulative heat conducted by pathways with a width of 20 mm and various pathway conductivities and lengths according to an embodiment of the present disclosure.

FIG. 11 illustrates the cumulative heat conducted by pathways with a width of 20 mm and various pathway conductivities and lengths, and the corresponding values are provided in TABLE 5. The simulation results are presented to highlight the impact of pathway penetration into the heat reservoir through to late times in a geothermal well's performance. The plot shows that in all instances, pathway performance is improved compared to the case where no pathway exists, represented by the initial point with zero pathway length and a cumulative energy of 546 kWh, where the reservoir rock thermal conductivity is applied. Higher pathway conductivity shows considerable performance improvements over lesser conductivities, with a near sixfold increase between the 40 W/m·K and the 400 W/m·K cases.

The plot also shows that the cumulative wellbore energy produced at a given conductivity does not improve appreciably for pathway lengths beyond a certain level. For example, with a 40 W/m·K conductivity, heat flow is not improved for pathway lengths beyond 2.5 m. For the 200 W/m·K and 400 W/m·K conductivities, the increases are relatively minor beyond 5 m and 10 m, respectively. The optimal thermal pathway length for an application may vary with the character of the well, the conductivity of the pathway, and the specifics of the desired thermal flow from the well. However, it is noted that an optimum length may exist, beyond which additional length provides little or no performance benefit in efficiently creating a pathway.

TABLE 5

| Cumulative Heat to 10,500 days thru a Thermal Pathway with Length (kWh) | | | |
| --- | --- | --- | --- |
| | Thermal Pathway Conductivity (m) | | |
| Length (m) | 40 W/m*K | 200 W/m*K | 400 W/m*K |
| None | 546 | 546 | 546 |
| 2 | 6,144 | 20,757 | 31,392 |
| 5 | 6,217 | 22,258 | 35,763 |
| 10 | 6,235 | 22,659 | 37,111 |
| 25 | 6,246 | 22,880 | 37,864 |

Exemplary Simulation on Pathway Conductivity

In this exemplary simulation of the geothermal enhancement process according to embodiments described herein, certain properties that contribute to the formation of a thermal pathway are modified to achieve a desired thermal conductivity, as depicted in FIGS. 12A, 12B, 13A, and 13B. In this simulation, the thermal conductivity and compressive mechanical behavior of particles are regulated at typical heat reservoir conditions to create a pathway containing highly conductive particles that are tightly packed within the thermal pathway. This maximizes the particle pack conductivity within the thermal pathway and supports heat flow from the heat reservoir to the wellbore during the geothermal recovery operation. The thermal conductivity of the thermal particles may be at least 15% greater than the surrounding rock.

As previously described, achieving a particle pack with the desired thermal conductivity (hereafter referred to as "pack conductivity") during the pathway creation phase is desirable, as this pack conductivity enables improved heat flow into the wellbore during thermal recovery, allowing for higher geothermal circulating fluid temperatures and greater overall energy recovery from the well.

Figure 12A:
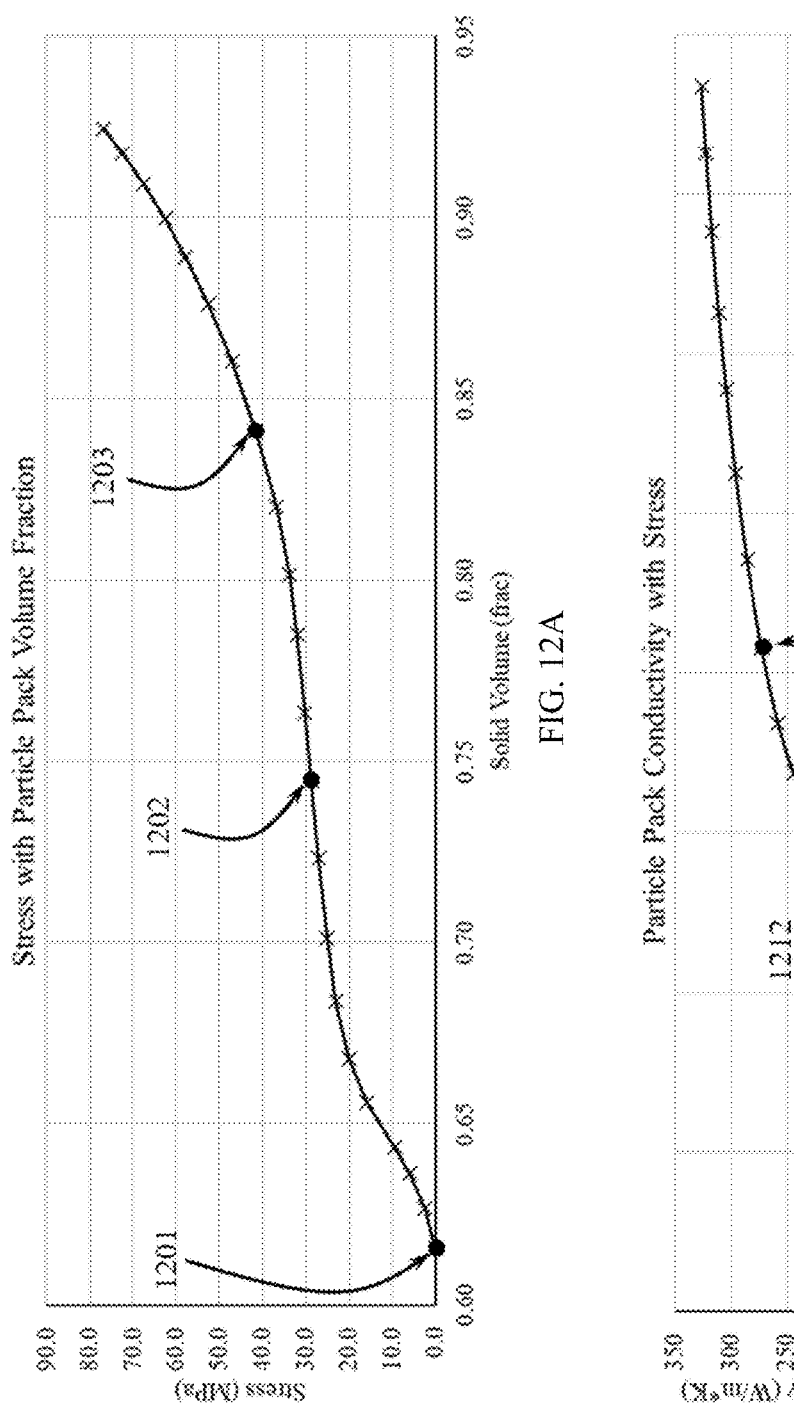
FIGS. 12A and 12B are exemplary plots of particle pack volume fraction and pack conductivity at various load stress
Figure 12B:
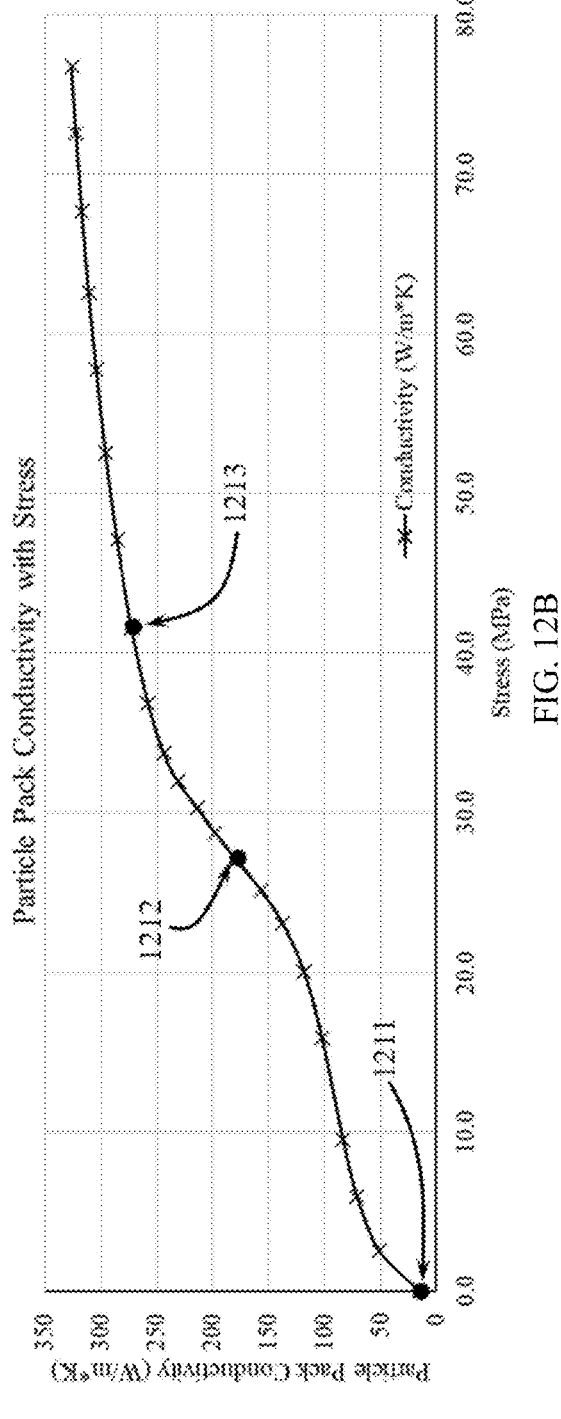

FIGS. 12A and 12B show the exemplary plots of particle pack volume fraction and pack conductivity at various load stress for a lower strength, malleable particle pack composed of a material such as copper having a thermal conductivity of 370 W/m·K. Referring to FIG. 12A, the initial packing solid volume fraction at 1201 (corresponding to the state indicate by 510 of FIG. 5 and by 601 of FIG. 6), found just as the pathway walls begin to close on the particles at zero stress load, is shown to be 61%. This initial packing fraction is representative of a rounded, well-sorted particle in a loose random packing configuration. Similarly, in FIG. 12B, the pack conductivity for this initial packing and stress load is shown at a value of 15 W/m·K at 1211. Pack conductivity is low in a loose packing configuration because there are comparatively few inter-particle contact points with small contact areas, and surface roughness may contribute significantly to inter-particle heat flow resistance.

Repacking and deformation occur as the particles are further stressed until the particle pack failure strength is reached at 27 MPa and the particle pack solid fraction increases to 71% at 1202. The corresponding pack conductivity improves to 178 W/m·K at 1212. The improvement in pack conductivity results from two main aspects. One aspect is particle repacking to equilibrate with stress, which increases the number of particle contacts and creates additional thermal flow paths through the pack. The second aspect is elastic and plastic deformation at the inter-particle stress points, resulting in increased particle contact areas for a larger heat flow area through the pack.

At stresses in excess of the failure strength of the particle pack at 1202, the thermal particles undergo a cycle of cracking, failure, deformation, and repacking until the particle size and shape are sufficient to support the applied stress and there is minimal opening for further repacking at 1203. This failure-repacking cycle results in a significant increase in particle contact area and number of contact points, but with smaller, cracked and fractured particles, the heat flow path becomes more tortuous. The increase in the solid fraction of the particle pack is large at 84% with a comparatively small change in stress to 42 MPa. In this case, the benefits of increased contact number and area outweigh the losses of a tortuous pathway with a significant improvement in pack conductivity to 271 W/m·K at 1213.

Once the particle pack has sufficiently deformed, cracked, crushed and fractured to minimize the interparticle void space, the particles are considered compacted and the pack volume fraction changes only slowly with continued loading. The compacted pack, with minimal interparticle void space, has few remaining high inter-particle stress points and exhibits mechanical behavior close to that of the parent material. Improvements in pack conductivity are marginal, with further minimal interparticle void space reduction due to the added stress. Notably, the pack will also exhibit a gradual trend toward the parent material conductivity, but may be inhibited by the increased number of contact resistance points due to particle size reduction and the tortuous heat flow path.

FIGS. 13A and 13B show the volume fraction and conductivity of a particle pack at various load stress for a high-strength, stiff particle pack made of a material such as a copper alloy having a thermal conductivity of 320 W/m·K. FIG. 13A shows the initial packing solid fraction of 67% at 1301 (corresponding to the state indicate by 510 of FIG. 5, by 601 of FIG. 6, and by 1201 of FIG. 12), which is found just as the pathway walls begin to close on the particles at zero stress load. This initial packing fraction is representative of an angular, poorly sorted particle in a tight random packing configuration. On the other hand, FIG. 13B shows the packing conductivity for this initial packing and stress load at a value of 16 W/m·K at 1311, which is low due to the comparatively few inter-particle contact points with small contact areas, and the surface roughness may contribute significantly to the inter-particle heat flow resistance.

As the stress on the particles increases, repacking and deformation occur until the particle pack failure strength is reached at 48 MPa. At this point, the solid fraction of the particle pack increases to 69% at 1302, and the corresponding pack conductivity improves to 82 W/m·K at 1312. The increase in pack conductivity is primarily due to particle repacking to equilibrate with the stress, resulting in additional thermal flow paths through the pack. For stiffer materials, however, the elastic and plastic deformation at the inter-particle stress points is negligible, resulting in little improvement in the thermal flow area through the pack.

Beyond the particle pack failure strength at 1302, the thermal particles undergo cycles of cracking, failure, and repacking until the particle size and shape are sufficient to support the applied stress. Little deformation occurs and considerable stress is required for additional fragmentation and crushing with little further repacking at 1303. As a result, the increase in pack solid fraction is comparatively minimal at 72% at a relatively high stress of 58 MPa. In this case, the stiff, strong particles resist deformation and are without the benefit of increasing particle contact number and area, resulting in losses from a tortuous path. The improvement in pack conductivity is minimal at 116 W/m·K at 1313.

Once the particle pack has undergone repacking and initial particle failures, the solid fraction of the pack changes slowly with loading. For stronger materials, the pack strength effectively supports additional loads, and improvements in pack conductivity are marginal, with minimal further void loss due to the added stress. Ultimately, the pack will exhibit a gradual trend toward the parent material conductivity with increasing stress.

FIGS. 12A, 12B, 13A, and 13B are graphical representations of particle volume fraction and pack conductivity for two different particle materials with different dimensional characteristics. FIGS. 12A and 12B represent a lower strength, malleable particle with a thermal conductivity of 370 W/m·K, while FIGS. 13A and 13B represent a higher strength, stiff particle with a thermal conductivity of 320 W/m·K. Both particle parent materials have similar thermal conductivities, but their compressive mechanical behavior and resulting pack conductivity are significantly different.

At a closure stress of 35 MPa, typical of common geothermal depths, the pack conductivities of the two particle types are compared. The lower strength, malleable particle deforms and packs more readily with increasing stress, resulting in better interparticle heat flow, higher particle pack volume fraction, and significantly better pack conductivity, approximately 250 W/m·K. Although the initial porosity and pack conductivity are lower due to the rounded and well-sorted dimensional character of the particle, the resulting compressive mechanical behavior significantly improves performance.

On the other hand, the higher strength, brittle particle is resistant to increasing stress and produces little deformation, resulting in marginal improvements in interparticle heat flow, comparatively little reduction in particle pack volume, and a pack conductivity of approximately 75 W/m·K. Due to its angular and poorly sorted dimensional character, the initial porosity and pack conductivity are higher. However, at common geothermal stresses, the resulting compressive mechanical behavior does little to improve thermal performance.

One of the objectives of the present disclosure is to achieve a target conductivity in a particle pack by manipulating the dimensional characteristics of certain high-conductivity particle materials. By selecting a dimensional characteristic that allows for dense packing at zero stress, the initial particle volume fraction and hence the thermal conductivity under the applied stress condition can be improved.

The size distribution of the dimensional characteristics (such as the ratio of particle sizes and the relative volume fraction of each particle size) may affect the initial particulate volume fraction by 20% or more. For example, the use of binary spherical particle sizes, with a 4:1 size ratio between large to small particles, and a volume fraction of large particles approaching 0.7, can reduce the initial pack volume particle fraction from 0.45 as from a singular particle size to 0.3 for a mixture of binary sized particles. The shape of the particles can also affect the initial particle volume fraction, with disks in a random dense packing approaching an initial particle volume fraction of 0.9 and subsequent improvements in thermal conductivity at a given applied compressive load.

Particles with shapes that promote high inter-particle stresses within a particle pack, such as non-rounded, non-spherical particles, can accelerate deformation or failure with stress to increase particle volume fraction and improve pack conductivity at a given applied load. Changing the dimensional characteristics of the thermal particles may alter the compressive mechanical behavior, allowing the use of higher and lower strength particles under specific conditions where satisfactory pack conductivity can not otherwise be provided. For example, in the case that thermal particle shapes are selected to have a particle pack failure strength less than the crack closure stress (minimum horizontal stress), the satisfactory particle volume fraction and thereby the pack conductivity at closure stress is achievable by manipulating the dimensional characteristics in addition to selecting the material for the thermal particles.

Selecting particles with specific dimensional characteristics may improve pack conductivities and allow for wider application of particulate materials. Improving the initial particle volume fraction and subsequent packing behavior under compressive loading, either individually or in combination, may result in improved pack conductivity. Particles may be manufactured or shaped to achieve specific particle dimensional characteristics to achieve the desired target conductivity.

Exemplary Simulation on Pathway Width

In this exemplary simulation of the geothermal enhancement process according to embodiments described herein, certain properties that contribute to the formation of a thermal pathway are modified to achieve a desired pathway width, as shown in FIGS. 12A, 12B, 13A, and 13B and listed in TABLE 6. Specifically, the modification involves controlling the injected particle volume fraction, the carrier fluid viscosity, and the injection rate to ensure proper placement within the thermal pathway during injection. The desired width of the thermal pathway is achieved after the fissure has fully closed on the slurry, under common heat reservoir conditions and for a specific pack conductivity. The carrier fluid used may or may not be viscous or viscosified, and may contain from 1% to 80% volume fraction of thermal particles.

A thermal pathway with an adequate width is desirable for enhanced heat flow into the wellbore because the pathway width supports enhanced heat flow into the wellbore during thermal recovery. This allows for higher geothermal circulating fluid temperatures and greater overall energy recovery from the well.

The creation of a pathway from injection to closure in a geothermal thermal pathway application has been completed using fissure modeling. The input data used for the modeling process is provided in TABLE 6, while TABLES 7 and 8 present the results obtained from the modeling process. The input data describes a typical sandstone heat reservoir with a well, and the induced fissure geometry is modeled using the PKN formulation.

The injection process involves placing 1.88 $m^3$ of thermal particles in 3.8 $m^3$ of carrier fluid. Carrier fluid viscosity, spurt loss, leak-off coefficient behavior, and injection rate are selected based on modeling to achieve the desired fissure dimensions and thermal particle transport into and along the fissure. The modeling process is iterative, adjusting the volume and behavior of the carrier fluid and the particle volumes to avoid bridging and aggregate blocking. This iterative process is used to achieve the desired fissure height, length, and width, and to transport and place the thermal particles along the fissure.

TABLE 7 shows the injection parameters, fissure dimensions, and fissure content determined by fissure modeling for each of the points of interest, including end of pad, end of injection, initial closure, and full closure. The lower strength, malleable particle material described in relation to FIGS. 12A and 12B is used in the modeling process.

TABLE 6

| Geothermal Pathway Fissure Modeling Inputs | |
| --- | --- |
| Heat Reservoir Rock and Fissure Parameters | |
| Fissure geometry | PKN |
| Rock character | Sandstone |
| Porosity | 8% |
| Fissure Height | 12 m |
| Closure Stress | 35 MPa |
| Injection Summary | |
| Injection Rate | 1.5 m3/min |
| Pad Volume | 0.75 m3 |
| Fluid volume injected | 3.82 m3 |
| Volume Particles Placed | 1.88 m3 |
| Mass Particles Placed | 16.8 tonne |
| Slurry Volume | 4.95 m3 |
| Particle Volume fraction | 0.33 (frac) |
| Treatment Design | Tip-Screen-Out |
| Particle Description | |
| Density | 8,930 kg/m3 |
| Mesh | 50 |
| Particle mean diameter | 0.27 mm |
| Carrier Fluid Description | |
| Fluid | Crosslinked Water |
| Viscosity | 500 cP |
| Leak-off Coeff. | 1.00e−3 m/min^0.5 |
| Spurt Loss | 4.07e−4 m |

TABLE 7

| Geothermal Pathway Fissure Modeling Results (lower strength, malleable particle) | | |
| --- | --- | --- |
| Injection Parameters | End of Pad | End of Injection |
| Clean Vol Inj (m3) | 0.75 | 3.82 |
| Vol Solid Inj (m3) | 0.00 | 1.88 |
| Slurry Vol Inj (m3) | 0.75 | 5.71 |
| Solid Vol Fraction | 0.00 | 0.330 |
| Fluid Efficiency | 0.374 | 0.695 |

| Fissure Dimensions | End of Pad | End of Injection | Initial Closure | Full Closure |
| --- | --- | --- | --- | --- |
| Fissure Vol (m3) | 0.28 | 3.97 | 3.08 | 2.32 |
| Length (m) | 6.7 | 12.3 | 12.3 | 12.3 |
| Max width (mm) | 2.7 | 23.5 | 14.4 | 10.8 |

| Fissure Content | End of Pad | End of Injection | Initial Closure | Full Closure |
| --- | --- | --- | --- | --- |
| Slurry (m3) | 0.00 | 3.97 | 3.08 | 2.32 |
| Fluid (m3) | 0.28 | 2.09 | 1.20 | 0.44 |
| Solid Volume (m3) | 0 | 1.88 | 1.88 | 1.88 |
| Solid Vol Fraction | 0.0 | 0.474 | 0.61 | 0.81 |
| Clean Vol Fraction | 1.0 | 0.53 | 0.39 | 0.19 |

When creating the thermal pathway, a volume of fluid free of solids is first injected to create a fissure opening that is at least wide enough to accommodate the thermal particles. In this case, a determined pad volume of 0.75 m³ is used to create a fissure volume of 0.28 m³ with a width of 2.7 mm. Using the particle size of 0.27 mm in TABLE 6, a width-to-particle ratio of 10 is calculated, indicating that particle bridging is unlikely. A slurry containing thermal particles is then injected into the established fissure until the injection is complete, with a total simulated injection volume of 5.71 m³ consisting of 3.82 m³ of carrier fluid transporting 1.88 m³ of thermal particles, resulting in an injected particle fraction of 0.33.

During injection, fluid leaks from the fissure into the pores of the surrounding heat reservoir, resulting in a total fissure volume of 3.97 m³ at the end of injection, consisting of 2.09 m³ of carrier fluid and 1.88 m³ of particles, for a particle volume fraction of 0.474. The fissure width at the end of the injection is 23.5 mm. A slurry with a low particle volume fraction will require a larger leak volume to achieve initial closure, resulting in a narrower fissure at initial and final closure. A high slurry particle volume fraction is desirable to achieve greater widths within the constraints of avoiding unwanted aggregate blocks within the fissure.

After the injection ceases, the fluid continues to leak from the fissure and the walls begin to close on the thermal particles. Initial closure is reached when the particles and the walls are just in contact, but not under closure stress. At this point, the particles are no longer suspended in the carrier fluid, are confined by the fissure walls, and have begun to pack. The initial particle packing is determined by the dimensional characteristics of the particles and results in a solid volume fraction. For the thermal particle shown in FIGS. 12A and 12B, the initial particle volume fraction is 0.61 at 1201, which is representative of a rounded, well-sorted particle in a loose random packing configuration. To achieve this volume fraction, an additional 0.89 m³ of carrier fluid is lost, resulting in a total fissure volume of 3.08 m³, now composed of 1.20 m³ of carrier fluid and 1.88 m³ of thermal particles. The particle volume fraction within the fissure is 0.61 and the fissure width is 14.4 mm.

The fissure continues to close on the particles until full closure is reached, where the particles support the full closure stress. At a closure stress of 35 MPa, for the lower strength, malleable particle shown in FIG. 12A, the volume fraction of the particles supporting this stress is 0.81. At this volume fraction, the carrier fluid exists only in the interstitial space of the pack within the fissure, where an additional 0.76 m³ has leaked into the surrounding rock pores. The fissure volume at full closure is 2.32 m³, containing 1.88 m³ of particles and 0.44 m³ of fluid. Due to the compressive mechanical behavior of the particles, deformation and repacking, the fissure width at full closure is reduced to 10.8 mm.

TABLE 8 shows the results of the injection parameters for the stiff, high strength material shown in FIG. 13. All injection parameters remain the same throughout the simulation, with initial fissure differences demonstrated during the initial closure phase. Due to the dimensional nature of the particles, the initial packing solid fraction is 0.67 and the retained carrier fluid volume is slightly higher at 0.33 m³, with an initial closure volume of 2.81 and a width of 15.8 mm.

At full closure, the compressive mechanical behavior of the high-strength, stiff particles result in a particle volume fraction of 0.69. Carrier fluid loss is low at 0.02 m³ with minimal change in solid fraction at closure due to particle strength. The closed fissure contains 0.85 m³ of fluid and 1.88 m³ of particles. It is noteworthy that the change in fissure width is minimal, decreasing from 15.8 mm at zero stress, initial closure, to 15.3 mm at 35 MPa, full closure.

TABLE 8

| Geothermal Pathway Fissure Modeling Results (higher strength, stiff particle) | | | | |
| --- | --- | --- | --- | --- |
| Fissure Dimensions | End of Pad | End of Injection | Initial Closure | Full Closure |
| Fissure Vol (m3) | 0.28 | 3.97 | 2.81 | 2.73 |
| Length (m) | 6.7 | 12.3 | 12.3 | 12.3 |
| Max width (mm) | 2.7 | 23.5 | 15.8 | 15.3 |

| Fissure Content | End of Pad | End of Injection | Initial Closure | Full Closure |
| --- | --- | --- | --- | --- |
| Slurry (m3) | 0.00 | 3.97 | 2.81 | 2.73 |
| Fluid (m3) | 0.28 | 2.09 | 0.93 | 0.85 |
| Solid Volume (m3) | 0 | 1.88 | 1.88 | 1.88 |
| Solid Vol Fraction | 0.0 | 0.474 | 0.67 | 0.69 |
| Clean Vol Fraction | 1.0 | 0.53 | 0.33 | 0.31 |

In contrast, at 35 MPa, there is a significant difference in fissure width between the lower strength, malleable particle (soft) and the higher strength, stiff particle (hard). The soft particle produces a fissure width of 10.8 mm, while the hard particle has a width of 15.3 mm. As shown earlier, increasing width results in an almost proportional increase in heat flow through a pathway, here representing a 40% improvement in width. However, the pack conductivity of the hard material is comparatively poor at 75 W/m·K compared to 250 W/m·K for the soft material.

When considering pack conductivity, a particle with favorable compressive mechanical behavior may be selected to achieve the desired conductivity. However, achieving an adequate thermal pathway width is often at conflict with the desirable compressive mechanical behavior required for high pack conductivity. For a given application, soft materials that provide good conductivity may produce undesirable widths. Alternatively, compressive mechanical behavior suitable for wider pathways may result in poor conductivities. In order to select a thermal particle that meets the target thermal flow enhancement requirements for an application, the pack thermal conductivity and width, it may be advantageous to first determine the particle conductivity, particle dimensional characteristics, and particle compressive mechanical behavior.

Exemplary Simulation of Thermal Flow Enhancement Process

The purpose of this example is to illustrate application of the method herein to enhance thermal flow from a subterranean heat reservoir. The heat reservoir is located 3,500 m below surface and intersected by a horizontal wellbore where a series of thermal pathways are to be placed along the wellbore. The well and thermal zone conditions are listed in TABLE 9. To meet the performance requirements of the thermal pathway, a finite element analysis is performed to determine the performance requirements of the thermal zone. The analysis indicates that the thermal pathway pack conductivity required is greater than 200 W/m·K, the pathway width is at least 10 mm, and the pathway length is greater than 5 m. In addition, an economic evaluation of the predicted recovered energy value from geothermal well operations requires the placement of 15 thermal pathways along the wellbore.

TABLE 9

Well and Thermal Zone Conditions

| Well Parameters | |
| --- | --- |
| Measured Depth | 5,500 m |
| Vertical Depth | 3,500 m |
| Well Type | Horizontal |
| Casing Dia. | 139.7 mm |

| Thermal Zone Description | |
| --- | --- |
| Reservoir Rock | Sandstone |
| Porosity | 8% |
| Reservoir Fluid | Water |
| Temperature Gradient | 0.0386 C./m |
| Reservoir Temperature | 140 C. |
| Pore Pressure Gradient | 8 kPa/m |
| Pore Pressure | 28 MPa |
| Stress Gradient | 18 kPa/m |
| Min. Hz. Stress | 63 MPa |
| Closure Stress | 35 MPa |

| Geothermal Operating Conditions | |
| --- | --- |
| Well Circulating Temp | 57 C. |
| Pathway Conductivity | 200 W/m*K |
| Pathway Width | 10 mm |
| Pathway Height | 12 m |
| Pathway Length | 10 m |
| # Placed pathways | 15 |

| Rock Thermal Properties | |
| --- | --- |
| Thermal Conductivity | 2.7 W/m*K |
| Specific Heat | 820 kg/KJ*K |
| Density | 2,438 kg/m3 |

| Carrier Fluid Description | |
| --- | --- |
| Fluid | Visco-Elastic Water |
| Viscosity | 500 cP |
| Leak-off Coeff. | 1.00e−3 m/min/0.5 |
| Spurt Loss | 4.07e−4 m |

To select an appropriate thermal particle, a material with a thermal conductivity higher than the desired pathway conductivity is selected. A copper parent material with a thermal conductivity approaching 400 W/m·K is selected to meet the target pathway conductivity of 200 W/m·K. Next, the maximum particle size that can be placed in a fissure is determined by modeling the fissure to be created in the thermal zone. The maximum particle size is determined to be 0.33 mm for placement in a fissure width of 2.7 mm at an injection rate of 1.5 $m^3$/min. A specific copper particle with a diameter less than 0.33 mm is selected based on availability and cost, and its diameter is determined to be 0.27 mm.

A suitable sample of the copper particle is taken and its pack conductivity and compressive mechanical behavior are determined at 35 MPa and 140° C. within the thermal zone. To ensure that the pack conductivity is measured based on the potentially worst case anisotropic compressive mechanical behavior of the pack, the pack conductivity is measured perpendicular to the applied axial stress. From the test, it is determined that the initial packing solid volume fraction for the particle is 0.61, with a solid volume fraction of 0.81 at 35 MPa, as shown in FIG. 13A. The particle pack conductivity test at 35 MPa yields an apparent conductivity of 250 W/m·K, which exceeds the target pathway conductivity of 200 W/m·K, as shown in FIG. 13B. A summary of the thermal particle description is given in TABLE 10.

TABLE 10

Thermal Particle Description Summary
Thermal Particle Description

| | |
| --- | --- |
| Density | 8,930 kg/m3 |
| Mesh | 50 |
| Particle mean diameter | 0.27 mm |
| Material Conductivity | 370 W/m*K |
| Shape | Rounded |
| Sorting | Well Sorted |
| Initial Packing Solid Fraction | 0.61 |
| Mat'l Compressive Strength | 330 MPa |
| Pack Ultimate Strength | 27 MPa |

After determining the appropriate conductivity is achieved and knowing the resulting solid volume fraction at thermal zone conditions, modeling of the fissure, particle transport into the fissure, and fissure closure dimensions is performed. At a fissure height of about 12 m, and to achieve the desired length and width during injection and closure, the completed modeling yields a required thermal material volume of 1.88 $m^3$ to be placed using 3.82 $m^3$ of carrier fluid at a rate of 1.5 $m^3$/min. At the end of injection, the fissure width is 23.5 mm with thermal particles placed along a length of 12.3 m.

With closure of the fissure to initial contact of the walls with the thermal particles, a solid volume fraction of 0.61, the fissure width is reduced to 14.4 mm, and at full closure, a solid volume fraction of 0.81, the width is determined to be 10.8 mm. The length at closure with thermal particles remains at 12.3 m. The results of the pathway width determination are shown in TABLE 7. The modeled injection schedule to create the thermal pathway is shown in TABLE 11.

Notably, a specific behavior of the carrier fluid is required to achieve these results. The viscosity of the carrier fluid assists in particle transport and width development within the fissure during injection, and also assists in particle suspension during closure. The desired viscosity for placement of this material is 500 cP, which is achieved using a water-based viscoelastic gel. The leak-off coefficient, 0.001 $m/min^{0.5}$, limits fluid loss from the fissure during injection to maintain width and ensure particle placement, but slows fissure closure once injection is complete.

TABLE 11

Thermal Pathway Injection Schedule
Injection Schedule

| Stage | Slurry Volume (m3) | Clean Volume (m3) | Vol Solid (m3) | Mass (kg) | Solid Vol Frac (frac) |
|---|---|---|---|---|---|
| Pad | 0.75 | 0.75 | 0 | 0 | 0 |
| 1 | 0.38 | 0.29 | 0.087 | 777 | 0.229 |
| 2 | 0.38 | 0.26 | 0.117 | 1,044 | 0.308 |
| 3 | 0.75 | 0.47 | 0.282 | 2,521 | 0.376 |
| 4 | 3.45 | 2.05 | 1.396 | 12,462 | 0.404 |
| Total | 5.71 | 3.82 | 1.882 | 16,804 | 0.330 |

After selecting the carrier fluid and injection conditions to create the desired thermal pathway, preparations are made to inject the mixture into the thermal zone. For placement of the thermal pathways, the well has been constructed with 15 mechanical ports evenly spaced along the horizontal run. The mechanical ports include an open-close sliding sleeve to provide hydraulic access and isolation to the surrounding heat reservoir rock.

To prepare the well for treatment, the wellbore is cleaned of debris and tested for hydraulic seal, and the first port at the toe of the well is opened to allow injected fluids to enter. The appropriate equipment from the equipment configuration in FIG. 4 is then transported and set up for injection at the geothermal well site. At least 15 m$^3$ of water is filled into the liquid tank 412 for the injection schedule and to flush the treatment into the created fissure. Viscoelastic viscosifiers are added to the water from the chemical source 414. The thermal particle storage 416 is loaded with approximately 17 tons of copper particles. The liquid tank 412 and chemical source 414 are connected to the mixing unit 418 via hoses or pipes, while the thermal particle storage 416 is connected to the mixing unit 418 via an auger or belt system to transport the particles into the mixer. The mixing unit 418, which includes a mixing tub or other devices, combines the water, viscosifying chemicals, and particles at the desired proportions. The mixing unit 418 is fluidly connected to the pressure pump, which may include a discharge pump to offload the mixture to the pressure pump 419. The pressure pump 419 is fluidly connected to the wellhead 432 and can inject the mixture from the mixing unit 418 into the wellbore at the desired rate and pressure.

The process begins by injecting a thermal pathway into the wellhead 432 using the injection schedule in TABLE 11. This involves injecting a pad volume of 0.75 m$^3$ with viscosifying chemicals to initiate the fissure and create the desired width for the thermal particles. Immediately after, stage 1 of the schedule is applied by mixing 0.087 m$^3$ of particulates with 0.29 m$^3$ of viscosified fluid and injecting it into the wellbore. Injection continues by consecutively mixing and injecting stages 2 through 4 into the wellbore, resulting in at least 1.88 m$^3$ of thermal particles being carried by 3.82 m$^3$ of viscosified carrier fluid. The mixture is then flushed from the wellbore into the fissure, and the well is shut in to allow the fissure to close on the injected particles. The pressure in the well is monitored until the fissure is closed or nearly closed on the materials, by observing that the pressure in the fissure has approached the pore pressure.

After confirming that the fissure is closed, the well is opened, the open port is closed to hydraulically isolate the treated interval, and the next port uphole is opened for injection. The equipment is then reloaded with chemicals, fluids, and thermal particles as needed, and the injection of particles is repeated according to the injection schedule in TABLE 11, flushed, the well shut in, opened, the port closed, and the next port opened. This injection and shut-in sequence is repeated until all desired thermal pathways have been placed.

With all thermal pathways in place, the well is then prepared for geothermal energy extraction. The well is first cleaned of debris and then pressure tested to ensure hydraulic isolation from the surrounding rock. Circulation tubing, often thermally insulated, is installed to provide fluid circulation in the annular space past the thermal pathways. The desired surface equipment to utilize the captured geothermal energy is installed, the well is circulated to the desired thermal fluid, and geothermal energy recovery operations are performed.

While the illustrative embodiments of the present invention are described in detail, it is not the intention of the applicant to restrict or in any way limit the scope of the appended claims to such detail. Additional advantages and modifications within the scope of the appended claims will readily be apparent to those skilled in the art. The invention in its broader aspects is therefore not limited to the specific details, representative apparatus and methods, and illustrative examples shown and described. Accordingly, departures may be made from such details without departing from the spirit or scope of the general concept.

What is claimed is:

1. A method comprising:

receiving a reservoir stress value and a pore pressure value of a subterranean heat reservoir where a thermal pathway is to be formed;

determining a thermal pathway stress load from the pore pressure value and the reservoir stress value;

setting a target thermal conductivity of the thermal pathway;

preparing a slurry for injecting into the subterranean heat reservoir at a location where the thermal pathway is to formed, the slurry comprising thermal particles and a carrier fluid;

wherein:

the thermal particles have a selected volume, material composition and physical properties sufficient to form the thermal pathway with a particle pack thermal conductivity that meets or exceeds the target thermal conductivity at the determined thermal pathway stress load; and the carrier fluid has a selected fluid volume and fluid viscosity sufficient for the slurry to be injected into openings of the subterranean heat reservoir at an injection pressure higher than the obtained reservoir stress to form the thermal pathway after full closure; and mixing the selected volume of thermal particles and the selected volume of carrier fluid to produce the slurry.

2. The method of claim 1, wherein the material composition comprises one or more of the following: lead, gold, silver, tin, zinc, aluminum, copper, brass, hematite, bronze, iron, graphite, aluminum oxide, aluminum nitride, silicon, beryllium oxide, or silicon carbide.

3. The method of claim 1, wherein the physical properties of the thermal particles comprise at least one of the following:

a particle size less than ⅓ of a width of the openings at the beginning of the injection of the slurry;

a particle shape being one or more of spherical, irregular, plate, or fiber;

a particle pack solid volume under the thermal pathway stress load ranged from 50% to 99% of a total volume of the target dimensions of the thermal pathway; or a particle thermal conductivity higher than the target thermal conductivity.

4. The method of claim 1, wherein the target dimensions of the thermal pathway comprise a target width inclusive of and between 1 mm and 30 mm and a target length inclusive of and between 1 m and 25 m.

5. The method of claim 1, wherein the target thermal conductivity is inclusive of and between 4 W/m·K and 400 W/m·K.

6. The method of claim 1, wherein the target thermal conductivity is higher than a reservoir thermal conductivity of the subterranean heat reservoir by at least 15%.

7. The method of claim 1 further comprising:

injecting the slurry into the openings in the subterranean heat reservoir at the injection pressure; and closing the openings containing the slurry to form the thermal pathway comprising:

ceasing injecting the slurry and allowing at least some of the volume of carrier fluid to leak from the openings into surrounding reservoir or a wellbore until a fluid pressure of the slurry equalizes with the pore pressure of the subterranean heat reservoir.

8. The method of claim 7 further comprising:

injecting an initial fluid into the subterranean heat reservoir at an initial pressure higher than the obtained reservoir stress to create the openings in the subterranean heat reservoir.

9. The method of claim 7, wherein:

the slurry is injected into the openings in the subterranean heat reservoir via the wellbore; and closing the openings containing the slurry further comprises:

recovering a portion of the volume of carrier fluid out of the wellbore after the thermal pathway is formed.

10. The method of claim 9 further comprising:

hydraulically isolating the thermal pathway from the wellbore after the recovering.

11. The method of claim 7, wherein injecting the slurry into the openings comprises:

injecting the slurry into the openings in a plurality of stages with varying ratios of a solid volume of the volume of thermal particles to the fluid volume of the volume of carrier fluid.

12. The method of claim 7, wherein the material composition comprises one or more of the following: lead, gold, silver, tin, zinc, aluminum, copper, brass, hematite, bronze, iron, graphite, aluminum oxide, aluminum nitride, silicon, beryllium oxide, or silicon carbide.

13. The method of claim 7, wherein the physical properties of the thermal particles comprise at least one of the following:

a particle size less than 1/3 of a width of the openings at the beginning of the injection of the slurry;

a particle shape being one or more of spherical, irregular, plate, or fiber;

a particle pack solid volume under the thermal pathway stress load ranged from 50% to 99% of a total volume of the target dimensions of the thermal pathway; or a particle thermal conductivity higher than the target thermal conductivity.

14. The method of claim 7, wherein the target dimensions of the thermal pathway comprise a target width inclusive of and between 1 mm and 30 mm and a target length inclusive of and between 1 m and 25 m.

15. The method of claim 7, wherein the target thermal conductivity is inclusive of and between 4 W/m·K and 400 W/m·K.

16. The method of claim 7, wherein the target thermal conductivity is higher than a reservoir thermal conductivity of the subterranean heat reservoir by at least 15%.

* * * * *